US008085333B2

(12) United States Patent
Kato

(10) Patent No.: US 8,085,333 B2
(45) Date of Patent: *Dec. 27, 2011

(54) DIGITAL CAMERA

(75) Inventor: Minoru Kato, Utsunomiya (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,256

(22) Filed: Apr. 7, 2010

(65) Prior Publication Data

US 2010/0194962 A1  Aug. 5, 2010

Related U.S. Application Data

(63) Continuation of application No. 11/727,508, filed on Mar. 27, 2007, now abandoned.

(30) Foreign Application Priority Data

Mar. 31, 2006  (JP) ................................. 2006-098778
Mar. 26, 2007  (JP) ................................. 2007-080233

(51) Int. Cl.
H04N 5/222 (2006.01)
G09G 5/00 (2006.01)
G03B 17/20 (2006.01)
G03B 17/18 (2006.01)

(52) U.S. Cl. ......... 348/333.12; 348/333.01; 348/333.05; 348/220.1; 348/333.06; 345/1.1; 345/3.1; 396/296; 396/282

(58) Field of Classification Search ........... 348/333.01–333.12, 218.1, 220.1; 45/1.1, 3.1, 30; 396/287–292, 296, 282, 396/373–376; 345/1.1, 3.1, 30
See application file for complete search history.

(56) References Cited

U.S. PATENT DOCUMENTS

| 5,640,627 | A | 6/1997 | Nakano et al. |
| 6,549,650 | B1* | 4/2003 | Ishikawa et al. ............... 382/154 |
| 7,508,438 | B2 | 3/2009 | Okamoto et al. |
| 7,525,580 | B2 | 4/2009 | Yoshino |
| 7,689,115 | B2* | 3/2010 | Takahashi ..................... 396/287 |
| 7,782,382 | B2* | 8/2010 | Fujimura ...................... 348/302 |
| 7,952,620 | B2 | 5/2011 | Yoshino |

(Continued)

FOREIGN PATENT DOCUMENTS

JP  A 64-013128  1/1989

(Continued)

OTHER PUBLICATIONS

Office Action issued in Japanese Patent Application No. 2006-022491 mailed on Sep. 7, 2010 (w/English Translation).

(Continued)

*Primary Examiner* — Lin Ye
*Assistant Examiner* — Marly Camargo
(74) *Attorney, Agent, or Firm* — Oliff & Berridge, PLC

(57) ABSTRACT

A digital camera includes: an image processing unit that creates first display image data and second display image data; a display device that displays a first screen image and a second screen image so as to allow a user to observe the first screen image when viewed along a first direction with respect to a display face and so as to allow the user to observe the second screen image when viewed along a second direction that differs from the first direction; and a control unit that instructs the display device to display the first display image data as the first screen image, and the second display image data as the second screen image.

8 Claims, 18 Drawing Sheets

U.S. PATENT DOCUMENTS

| | | | |
|---|---|---|---|
| 2003/0090495 A1* | 5/2003 | Tomita | 345/619 |
| 2004/0027624 A1 | 2/2004 | Parulski et al. | |
| 2004/0183934 A1* | 9/2004 | Tatamiya | 348/333.02 |
| 2004/0223049 A1 | 11/2004 | Taniguchi et al. | |
| 2006/0140621 A1* | 6/2006 | Misawa | 396/374 |
| 2006/0268159 A1 | 11/2006 | Orimoto et al. | |
| 2007/0153110 A1 | 7/2007 | Fujimura | |
| 2007/0229695 A1 | 10/2007 | Kato | |
| 2007/0296874 A1* | 12/2007 | Yoshimoto et al. | 348/739 |
| 2009/0219430 A1 | 9/2009 | Okamoto et al. | |
| 2010/0083316 A1* | 4/2010 | Togashi et al. | 725/41 |

FOREIGN PATENT DOCUMENTS

| | | |
|---|---|---|
| JP | A 05-045711 | 2/1993 |
| JP | A 11-133403 | 5/1999 |
| JP | A-11-355624 | 12/1999 |
| JP | A 2003-208113 | 7/2003 |
| JP | A-2004-163447 | 6/2004 |
| JP | A 2004-254302 | 9/2004 |
| JP | A-2005-086283 | 3/2005 |
| JP | A-2005-176136 | 6/2005 |
| JP | A-2005-292325 | 10/2005 |
| JP | A-2006-067464 | 3/2006 |
| JP | A-2006-086780 | 3/2006 |
| JP | A 2006-184916 | 7/2006 |
| JP | A-2007-184734 | 7/2007 |
| WO | WO 2005/099248 A2 | 10/2005 |

OTHER PUBLICATIONS

Office Action issued in U.S. Appl. No. 11/657,582 mailed on Dec. 24, 2008.

Office Action issued in U.S. Appl. No. 11/727,508 mailed on Oct. 7, 2009.

Office Action issued in EP Application No. 07 105 394.6 on May 12, 2011.

Office Action issued in JP Application No. 2007-080233 on Jul. 12, 2011 (with English translation).

Oct. 3, 2011 Notice of Allowance issued in U.S. Appl. No. 12/624,235.

Oct. 4, 2011 Office Action issued in JP Application No. 2007-080233 (with English translation).

* cited by examiner

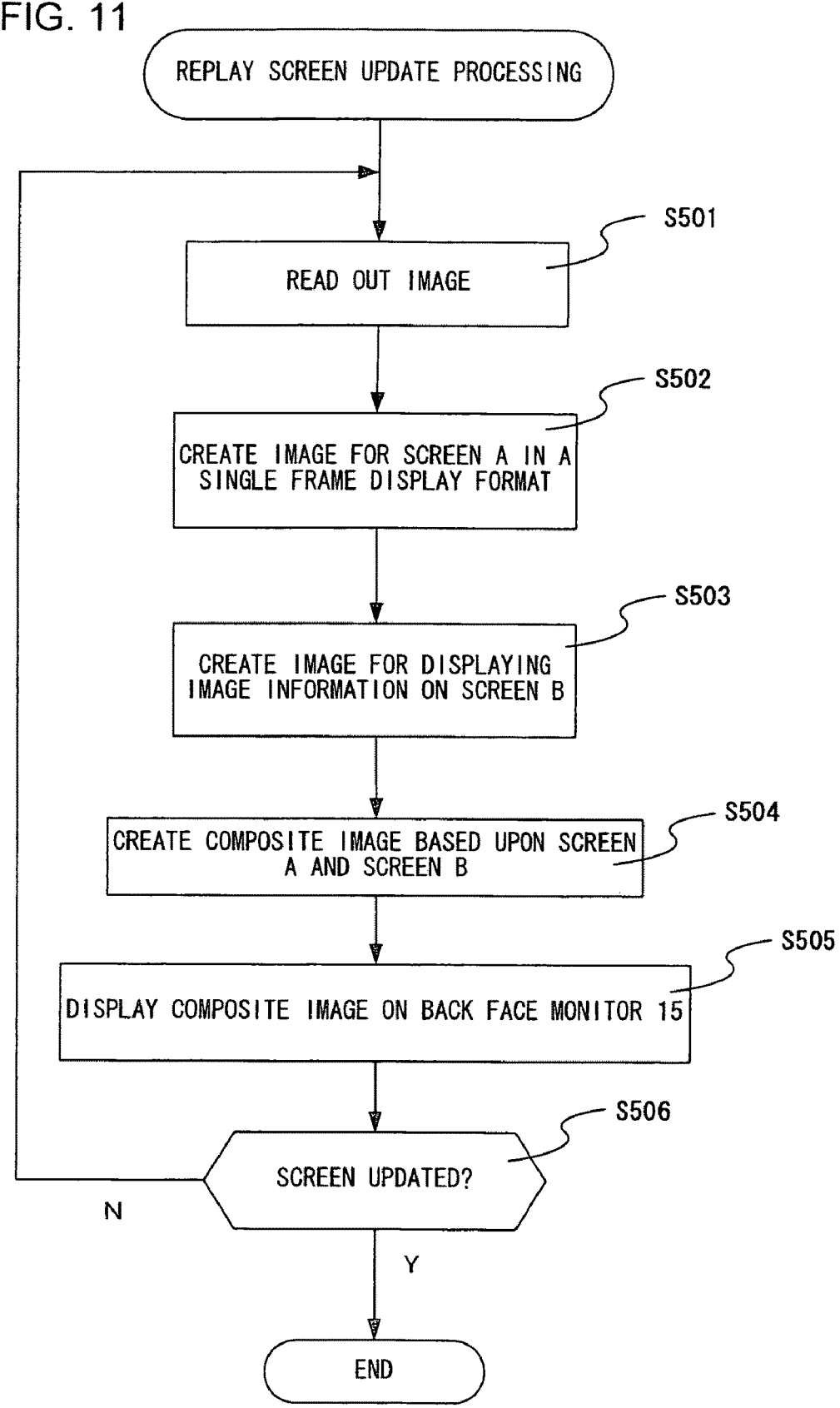

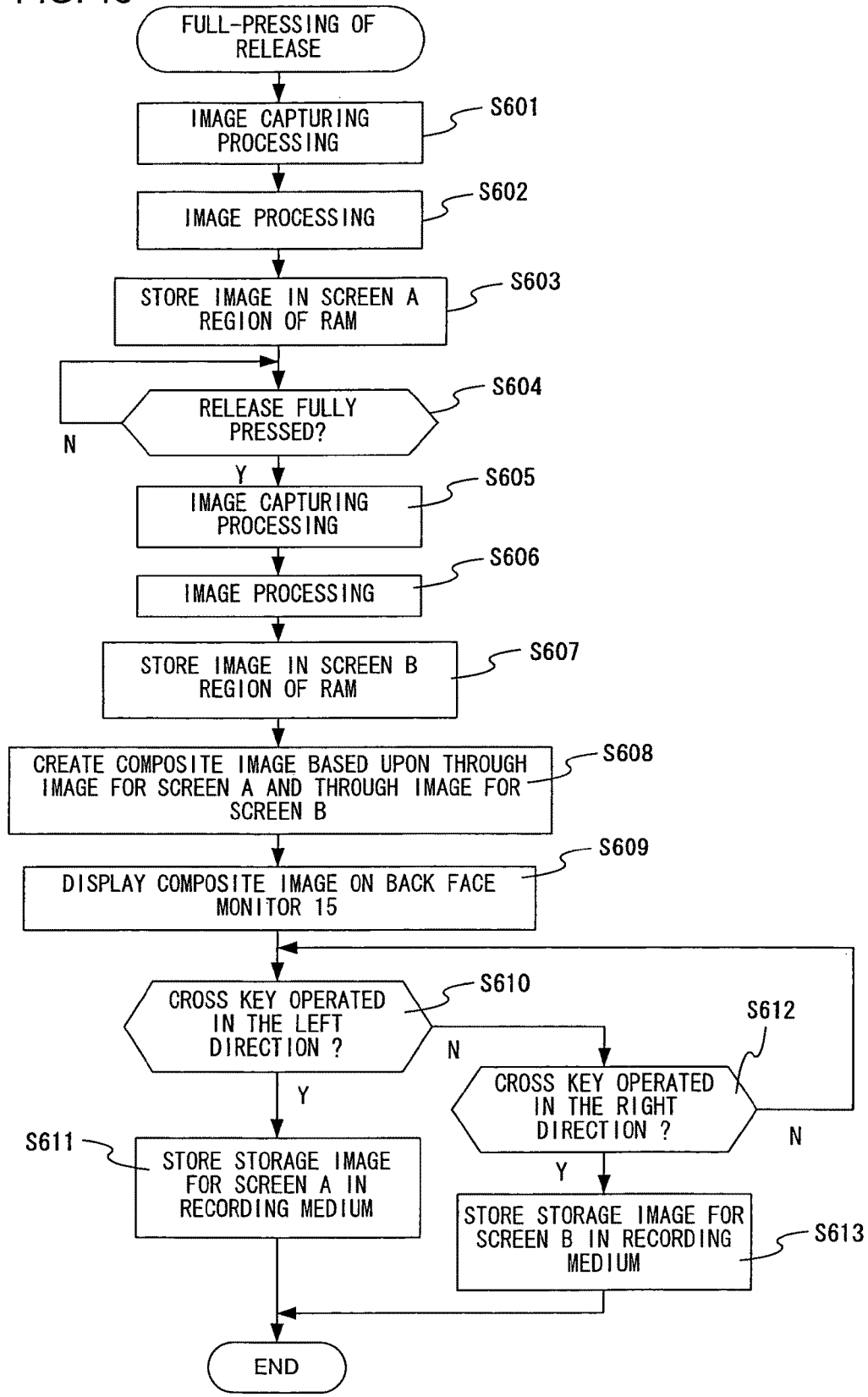

DIGITAL CAMERA

INCORPORATION BY REFERENCE

This is a Continuation of application Ser. No. 11/727,508 filed Mar. 27, 2007, which claims priority to Japanese Patent Application No. 2006-098778 filed Mar. 31, 2006 and Japanese Patent Application No. 2007-080233 filed Mar. 26, 2007.

BACKGROUND OF THE INVENTION

1. Field of the Invention

The present invention relates to a digital camera.

2. Description of the Related Art

Conventional digital single lens reflex cameras are known having multiple display members such as a back face display member for displaying a captured image and so forth, and an upper face display member for displaying the setting information with respect to the camera such as the shutter speed, the aperture value, etc. However, such an arrangement including multiple display members leads to difficulty in providing a camera with a small size or at a reduced cost. In order to solve the aforementioned problem, Japanese Patent Laid-Open Publication No. 2004-254302 discloses a digital camera which displays both a moving image and the camera information on a single display unit in a superimposed manner.

However, with the digital camera disclosed in the aforementioned publication, a moving image and the camera information are displayed in a superimposed form, leading to a problem of difficulty in ascertaining both the image and the information.

SUMMARY OF THE INVENTION

A digital camera according to a first aspect of the present invention includes: an image processing unit that creates first display image data and second display image data; a display device that displays a first screen image and a second screen image so as to allow a user to observe the first screen image when viewed along a first direction with respect to a display face and so as to allow the user to observe the second screen image when viewed along a second direction that differs from the first direction; a control unit that instructs the display device to display the first display image data as the first screen image, and the second display image data as the second screen image; and an imaging device that captures an image of a subject, and outputs a subject image signal, wherein: the image processing unit creates the first display image data based upon the subject image signal; and the control unit instructs the image processing unit to serially create the first display image data, and instructs the display device to display the first display image data thus serially created in a form of a moving image.

In the digital camera according to the first aspect, the image processing unit may create the second display image data by superimposing predetermined information on the first display image data; and the control unit may instruct the image processing unit to serially create the second display image data, and instructs the display device to display the second display image data thus serially created in a form of a moving image.

The digital camera according to the first aspect further includes a storage unit that temporarily stores an original image to be used for creating the second display image data with the image processing unit, wherein the image processing unit may create the second display image data based upon the original image data stored in the storage unit; and the control unit may instruct the display device to display the second display image data as the second screen image in a form of a still image.

A digital camera according to a second aspect of the present invention includes: an image processing unit that creates first display image data and second display image data; a display device that displays a first screen image and a second screen image so as to allow a user to observe the first screen image when viewed along a first direction with respect to a display face and so as to allow the user to observe the second screen image when viewed along a second direction that differs from the first direction; a control unit that instructs the display device to display the first display image data as the first screen image, and the second display image data as the second screen image; and a menu storing unit that stores first menu screen information and second menu screen information for displaying multiple menu items on the display device, wherein: the image processing unit creates the first display image data and the second display image data based upon the first menu screen information and the second menu screen information, respectively.

A digital camera according to a third aspect of the present invention includes: an image processing unit that creates first display image data and second display image data; a display device that displays a first screen image and a second screen image so as to allow a user to observe the first screen image when viewed along a first direction with respect to a display face and so as to allow the user to observe the second screen image when viewed along a second direction that differs from the first direction; a control unit that instructs the display device to display the first display image data as the first screen image, and the second display image data as the second screen image; an imaging device that captures an image of a subject, and outputs a subject image signal; and a storage unit that temporarily stores an original image to be used for creating the first display image data with the image processing unit, wherein: the image processing unit creates the first display image data based upon the original image data stored in the storage unit and creates the second display image data representing image information based upon image information attached to the original image data.

A digital camera according to a fourth aspect of the present invention includes: an image processing unit that creates first display image data and second display image data; a display device that displays a first screen image and a second screen image so as to allow a user to observe the first screen image when viewed along a first direction with respect to a display face and so as to allow the user to observe the second screen image when viewed along a second direction that differs from the first direction; a control unit that instructs the display device to display the first display image data as the first screen image, and the second display image data as the second screen image; and a storage unit that temporarily stores an original image to be used for creating the first display image data and the second display image data with the image processing unit, wherein: the image processing unit creates the first display image data based upon the original image data stored in the storage unit and creates the second display image data that differs from the first display image data by subjecting the original image data to image processing.

In the digital camera according to the fourth aspect, it is preferable that the image processing unit creates a trimmed image data by trimming the original image data and then creates the second display image data based upon the trimmed image data.

A digital camera according to a fifth aspect of the present invention includes: an image processing unit that creates first display image data and second display image data; a display device that displays a first screen image and a second screen image so as to allow a user to observe the first screen image when viewed along a first direction with respect to a display face and so as to allow the user to observe the second screen image when viewed along a second direction that differs from the first direction; a control unit that instructs the display device to display the first display image data as the first screen image, and the second display image data as the second screen image; an imaging device that captures an image of a subject, and outputs a subject image signal; and a storage unit that temporarily stores image data, wherein: the image processing unit performs processing (a) in which the first display image data is created based upon the subject image signal captured by and output from the imaging device with first camera settings, and the first display image data thus created is stored in the storage unit, and processing (b) in which the second display image data is created based upon the subject image signal captured by and output from the imaging device with second camera settings that differ from the first camera settings, and the second display image data thus created is stored in the storage device; and the control unit instructs the display device to display the first image display data and the second display image data, which are stored in the storage unit, in the form of the first screen image and the second screen image, respectively.

BRIEF DESCRIPTION OF THE DRAWINGS

FIG. 11 is a flowchart for describing a processing procedure for updating a replay screen according to a modification 2;

FIG. 16 is a flowchart for describing a processing procedure for displaying an image according to a modification 6;

DESCRIPTION OF THE PREFERRED EMBODIMENTS

Description will be made regarding a digital camera 1 according to an embodiment to which the present invention has been applied.

[Digital Camera 1]

Figure 1:
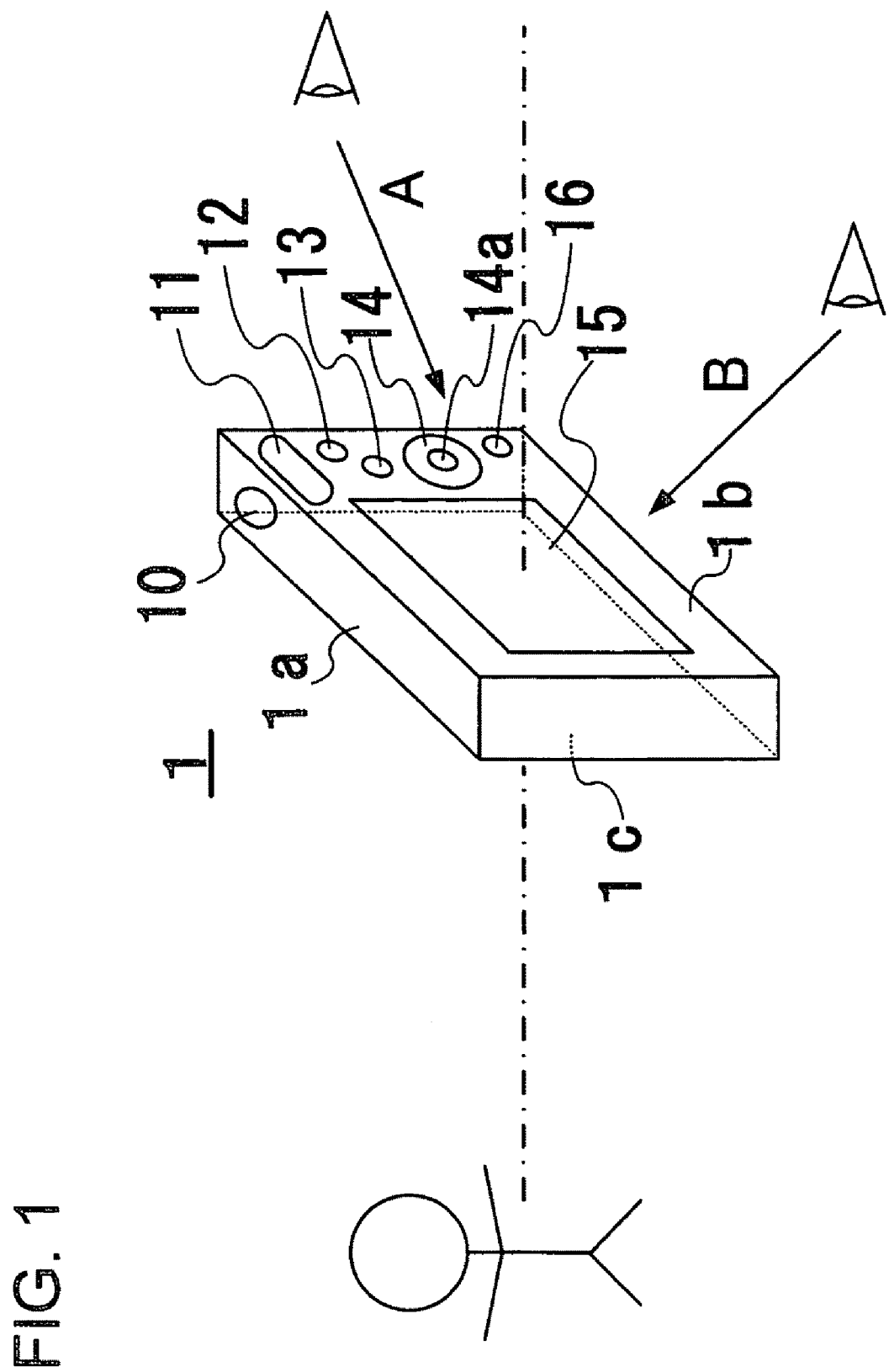
FIG. 1 is a perspective view of a digital camera according to an embodiment of the present invention.

FIG. 1 is an external view of a digital camera 1 as viewed from the back side thereof. Here, the digital camera 1 is a compact camera having a configuration in which a lens barrel and a camera main body are provided in the form of a single unit.

The digital camera 1 according to the present embodiment is formed in a shape of a rectangular parallelepiped. The digital camera 1 includes: a shutter release button 10 provided on an upper face 1a thereof; a zoom button 11, a replay button 12; a menu button 13, a cross button 14, a back face monitor 15, a function button 16, and so forth provided on a back face 1b thereof. Note that the digital camera 1 further includes a lens, which is included in a photographic optical system 32 (see FIG. 2), provided on a front face 1c thereof.

The shutter release button 10 is a double-action switch having a half-press switch and a full-press switch. Upon half-pressing the shutter release button 10, the half-press switch is turned on. On the other hand, upon full-pressing the shutter release button 10, the full-press switch is turned on. The zoom button 11 is a switch that allows the zoom power of the photographic optical system 32 to be changed. The replay button 12 is a switch that allows the operation mode to be switched to a replay mode for displaying captured images on the back face monitor 15. The menu button 13 allows a menu to be displayed on the back face monitor 15. The menu button 13 is a switch that allows the operation mode to be switched to a menu mode that allows the user to select the operation settings of the digital camera 1, and so forth. The cross key 14 is a known cross key having four contacts in four directions, i.e., the upper direction, the lower direction, the left direction, and the right direction. Furthermore, the cross key 14 has a decision button 14a in the central portion thereof. The function button 16 is a switch which is to be operated by the user, and which allows the user to input various operation instructions to the digital camera 1.

The back face monitor 15 is a liquid crystal display device that provides: a function of displaying a moving image of the subject at the time of capturing an image, i.e., a function of displaying a through image; and a function of displaying a stored image, a menu screen, and so forth. The back face monitor 15 according to the present embodiment has a configuration in which micro-prism arrays, each of which has a slender shape that corresponds to two display pixel lines, are disposed parallel to each other. Such a configuration of the digital camera 1 allows the user to ascertain information that differs between a case in which the back face monitor 15 is viewed from the upper side (along the arrow A) and a case in which the back face monitor 15 is viewed from the lower side (along the arrow B). Let us refer to the display screen that can be examined in a case in which the back face monitor 15 is viewed from the upper side (along the arrow A) as "screen A"

hereafter. On the other hand, let us refer to the display screen that can be examined in a case in which the back face monitor 15 is viewed from the lower side (along the arrow B) as "screen B" hereafter.

[Block Diagram of the Digital Camera 1]

Figure 2:
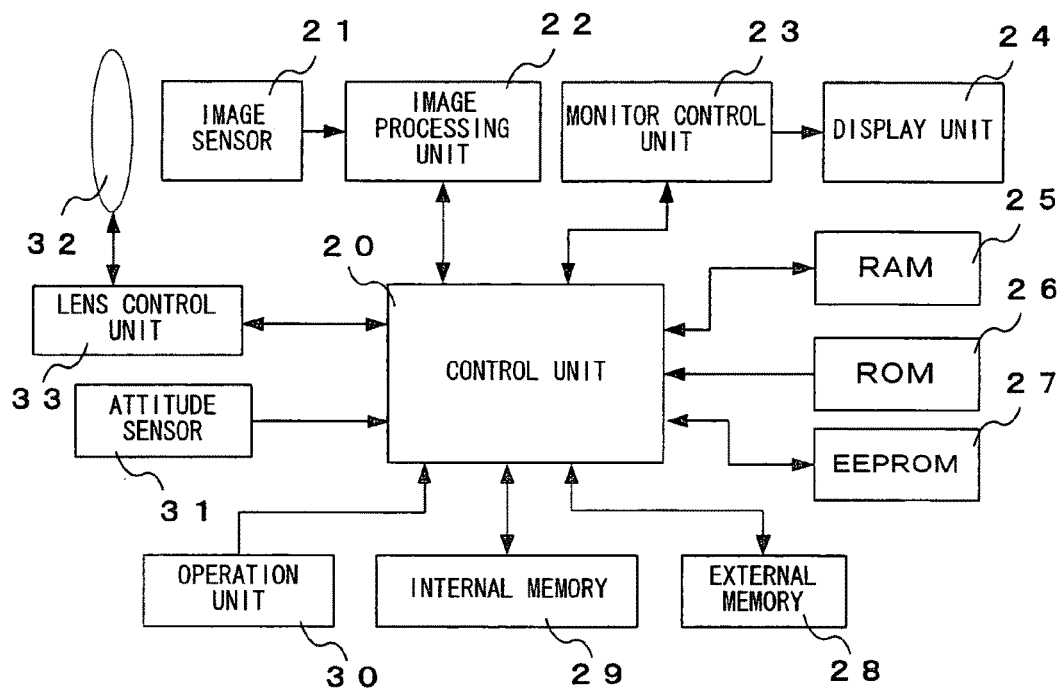
FIG. 2 is a block diagram which shows the digital camera shown in FIG. 1.

Description will be made below regarding the components and the basic operation of the digital camera 1 according to the present embodiment with reference to a block diagram. FIG. 2 is a block diagram which shows the digital camera 1.

[Control Unit]

A control unit 20 includes a CPU and so forth, which controls the overall system of the digital camera 1. The control unit 20 is connected to an image sensor 21, an image processing unit 22, a monitor control unit 23, a display unit 24, RAM 25, ROM 26, EEPROM 27, external memory 28, internal memory 29, an operation unit 30, an attitude sensor 31, a lens control unit 33, and so forth, and controls each of these components.

[Image Capturing and Image Processing]

The photographic optical system 32 is an optical system having a configuration including multiple lenses for forming an image of the subject on the image sensor 21. Furthermore, the photographic optical system 32 further includes a zoom optical system that allows the focal distance to be changed. The lens control unit 33 drives the zoom optical system so as to change the focal distance according to a control signal received from the control unit 20.

The image sensor 21 is a solid state image sensor such as a CCD, a CMOS, or the like, for converting the image of the subject formed by the photographic optical system 32 into an electric signal. The image sensor 21 also includes a driver or the like, which provides a function of readout control for an image signal and so forth, and a function of driving control for an electronic shutter and so forth. The image signal read out from the image sensor 21 is transmitted to the image processing unit 22. The image processing unit 22 performs various processing such as noise removal, A/D conversion, color interpolation, resizing, coding, and so forth, as necessary, thereby creating the display image data which is to be displayed on the back face monitor 15, storage image data, or the like. The aforementioned storage image data is stored in the external memory 28 in the form of an image file along with the image capturing information at the moment of image capturing. On the other hand, the display image data is displayed on the back face monitor 15 of the display unit 24 by the monitor control unit 23.

The term "image capturing information" as used here represents the image capturing information at the moment of image capturing, such as the shutter speed, the aperture value, date at which the image was captured, and so forth. The image capturing information is included in a file header in the form of EXIF information, for example. Note that the image file may be stored in the EEPROM 27, the internal memory 29, or the like.

Note that the image processing unit 22 also provides a function of reading out an image stored in the external memory 28 or the internal memory 29, and creating a display image which is to be displayed on the back face monitor 15. Also, the image processing unit 22 can perform various kinds of image processing for the image data stored in the external memory 28.

Here, examples of such image processing include: color conversion processing for converting a color component of the image data to another color component (for example, conversion of a color image into a monochrome image, color density adjustment, etc); tone correction processing; edge enhancement processing; contrast adjustment processing; trimming processing for trimming a part of the image data area; resize processing for changing the resolution of the image data.

[Storage Processing]

The RAM 25 is used as a temporary storage device for the data in a step in which the control unit 20, the image processing unit 22, or the like performs processing. The RAM 25 is a storage unit that to be used when creating a display image at the image processing unit 22. The ROM 26 stores a program necessary for the operation of the digital camera 1, the initial values used in the program, and so forth. The ROM 26 also stores various menu items to be displayed in a menu mode to be detailed later. The EEPROM 27 is a rewritable memory such as flash memory or the like, which has a function of holding the stored information after the power supply of the digital camera 1 has been turned off. The EEPROM 27 stores the information such as the user settings, the customized settings, etc., with respect to the digital camera 1. The external memory 28 is a detachable memory card for storing image files and so forth. The internal memory 29 is a storage medium for storing image files and so forth, examples of which include: a large-capacity magnetic disk such as a hard disk, etc; a large-capacity optical disk such as a DVD etc.; and flash memory.

[Image Display Processing]

The monitor control unit 23 creates a composite image based upon an image data set that consists of two images, i.e., the image data for the screen A and the image data for the screen B, transmitted according to an instruction from the control unit 20, and displays the composite image on the back face monitor 15 of the display unit 24. The display unit 24 includes the back face monitor 15 and a driver. Let us consider a case in which the user views the back face monitor 15, on which the composite image is displayed, from the upper side (along the direction A). In this case, such an arrangement allows the user to examine (observe) the image data for the screen A. On the other hand, in a case in which the user views the back face monitor 15 from the lower side (along the direction B), such an arrangement allows the user to examine (observe) the image data for the screen B. Note that such an arrangement allows the user to examine both the image data for the screen A and the image data for the screen B in a single mode.

[Operation Unit]

The operation unit 30 includes the shutter release button 10, the zoom button 11, the replay button 12, the menu button 13, the cross button 14, and the function button 16, and so forth.

[Attitude Sensor]

The attitude sensor 31 includes multiple acceleration sensors, whereby the attitude of the digital camera 1 can be detected in a three-dimensional manner. With the present embodiment, the attitude sensor 31 provides a function of determining whether the digital camera 1 is in the level state, in which the display face of the back face monitor 15 is approximately parallel to the direction of gravity, or the tilt state, in which the display face of the back face monitor 15 is tilted with respect to the direction of gravity, based upon the detection results received from the attitude sensor 31. Note that any kind of sensor may be employed as such an attitude detection sensor as long as the sensor is capable of detecting at least two attitudes.

[Operation Mode]

The digital camera 1 according to the present embodiment provides operation modes, i.e., a photographing or image capturing mode for performing an image capturing operation and processing for the image thus captured according to image capturing/processing settings set by the user, a menu mode which allows the user to set various kinds of settings while examining the menu screen displayed on the back face monitor 15, and an image display mode for displaying the storage image data thus captured or the like on the back face monitor 15. The operation control of the digital camera 1 for each of the image capturing mode, the menu mode, and the image display mode, is known processing, and accordingly, detailed description thereof will be omitted.

Description will be made regarding display images displayed on the back face monitor 15 in the form of the screen A and the screen B for each operation mode.

[Image Capturing Mode]

The digital camera 1 according to the present embodiment in the image capturing mode provides: a function of instructing the image processing unit 22 to perform processing for the image signals serially captured by the aforementioned image sensor 21 so as to create display image data (which will be referred to as "through images" hereafter); and a function of serially displaying the through images thus created on the back face monitor 15 (which will be referred to as "through image display" hereafter).

Figure 3A:
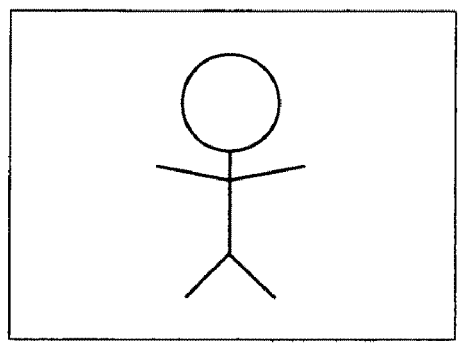
FIGS. 3A and 3B show examples of through images displayed on a back face monitor.
Figure 3B:
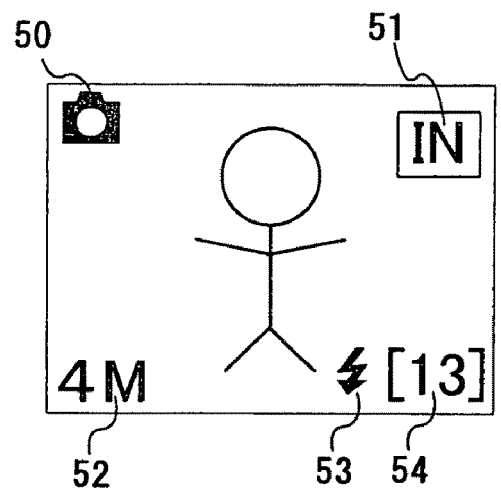

In the image capturing mode, in a case that the user views the display monitor 15 from the upper side (in the direction of the arrow A), the display monitor 15 allows the user to observe only the through images. On the other hand, in a case that the user views the display monitor 15 from the lower side (in the direction of the arrow B), the display monitor 15 allows the user to observe a screen that includes the camera information such as the image capturing settings, the number of images which can be captured, etc., and the through image in a superimposed form. With regard to the digital camera 1 shown in FIG. 1, FIG. 3A shows an example of the screen A displayed on the back face monitor 15 in a case in which the display monitor 15 is being viewed from the upper side (in the direction of the arrow A). On the other hand, FIG. 3B shows an example of the screen B displayed on the back face monitor 15 in a case in which the display monitor 15 is being viewed from the lower side (in the direction of the arrow B).

As shown in FIG. 3A, in a case that the user views the back face monitor 15 from the upper side (in the direction of the arrow A), such an arrangement allows the user to observe only the through image, which denotes the subject image. On the other hand, in a case that the user views the back face monitor 15 from the lower side (in the direction of the arrow B), such an arrangement allows the user to observe the camera information superimposed on the through image as shown in FIG. 3B. FIG. 3B shows an example of the camera information thus displayed, which includes: a camera operation mode mark 50 which indicates the operation mode of the digital camera 1; a storage destination mark 51 which indicates that the storage destination to which the captured image is to be stored is the internal memory 29; a resolution value 52 which indicates the resolution with which a captured image is stored; a flash icon 53 which indicates the flash mode; a remaining frame value 54 which indicates the number of frames that can be stored in the storage medium specified as the storage destination; etc.

Description will be made with reference to the flowchart in FIG. 7 regarding the processing procedure for displaying a through image on the back face monitor 15 in the image capturing mode.

Figure 7:
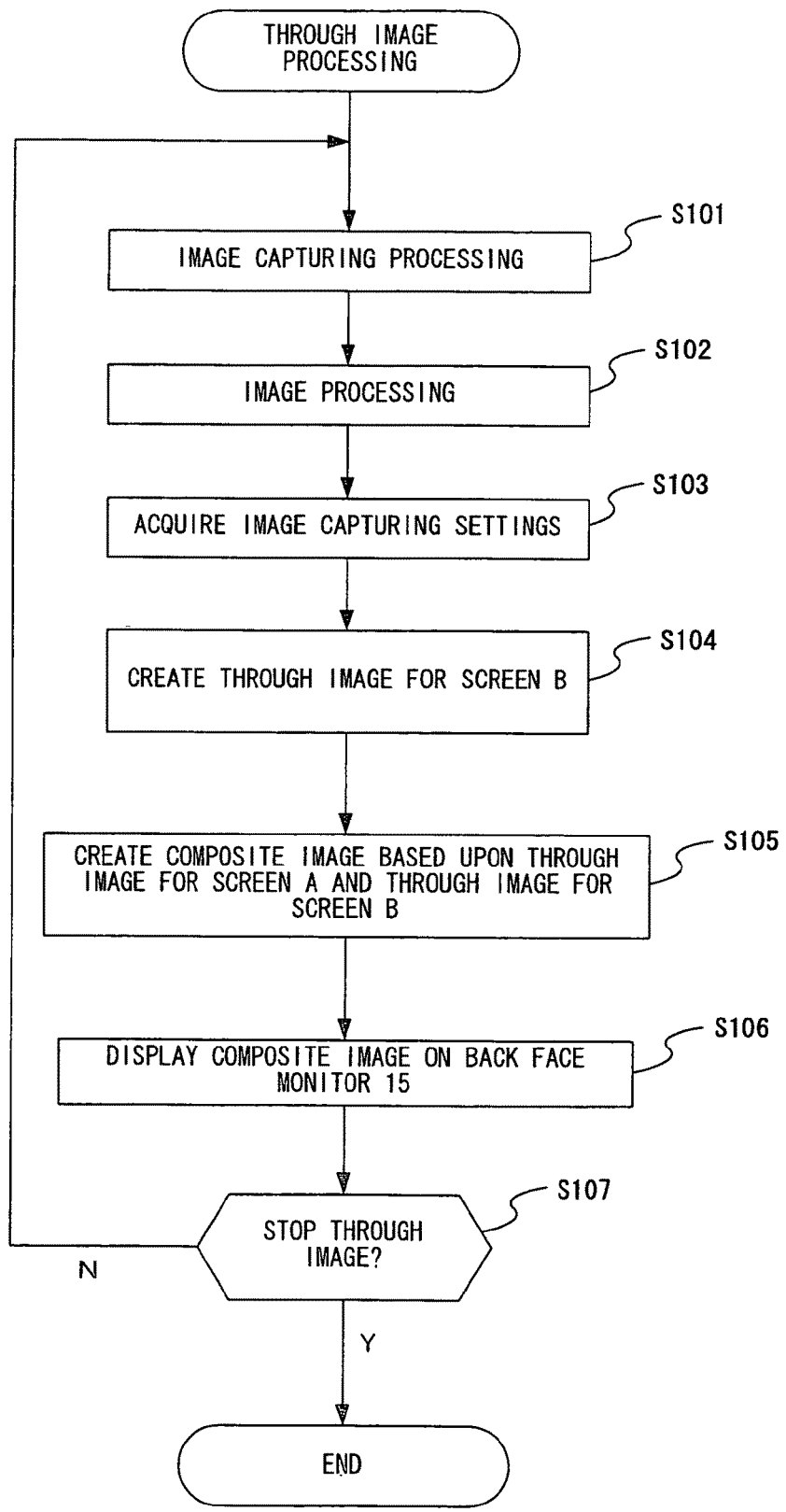
FIG. 7 is a flowchart for describing a processing procedure for displaying a through image.

Upon setting the operation mode of the digital camera 1 to the image capturing mode, the through image processing shown in FIG. 7 is started. In Step S101, the image sensor 21 captures an image of the subject, and outputs an image signal.

In Step S102, the image processing unit 22 performs image processing for the image signal output from the image sensor 21 so as to create the image data for the screen A (through image). The image data for the screen A is stored in the screen A region of the RAM 25. In Step S103, the camera information is acquired. Note that the camera information acquired in Step S103 includes the operation mode, the image storage destination setting, storage resolution setting value, the flash mode, the number of frames that can be stored, and so forth.

In the following Step S104, the image processing unit 22 reads out the image data for the screen A (through image data) from the screen A region of the RAM 25, and superimposes the camera information thus acquired in Step S103 onto the image data for the screen A, thereby creating the image data for the screen B (the through image data including the camera information in a superimposed form). The image data for the screen B thus created is stored in the screen B region of the RAM 25. Note that, instead of the image capturing information for capturing an image of the subject in Step S101, the camera information to be superimposed on the through image may include: the setting values with respect to the image capturing operation of the camera such as the shutter speed setting value, aperture setting value, etc., used for capturing an image at the time of full-pressing the shutter release button 10 for creating the storage image data; the setting values with respect to the image processing such as the white balance setting value etc.

In Step S105, the image processing unit 22 reads out the image data for the screen A and the image data for the screen B from the image A region and the image B region of the RAM 25, and creates data for a composite image based upon the image data for the screen A and the image data for the screen B. The composite image data thus created is stored in the display image region of the RAM 25. In Step S106, the monitor control unit 23 reads out the composite image data stored in the display image region of the RAM 25, and displays the composite image data on the back face monitor 15. In this stage, the back face monitor 15 displays the image for the screen A and the image for the screen B at the same time, based upon the image data for the screen A and the image data for the screen B, respectively. In a case that the user views the back face monitor 15 from the upper side (in the direction of the arrow A), such an arrangement allows the user to observe the screen A. On the other hand, in a case that the user views the back face monitor 15 from the lower side (in the direction of the arrow B), such an arrangement allows the user to observe the screen B.

In step S107, determination is made whether or not the through image stop processing has been performed. In a case that the through image stop processing has been performed, the through image processing shown in FIG. 7 is terminated. On the other hand, in a case that the through image stop processing has not been performed, the flow returns to Step S101, and the through image processing is continued. Examples of the cases in which the through image stop processing is performed include: a case in which the image capturing processing for an image for storage is started according to the operation of full-pressing the shutter release button 10 of the digital camera 1; a case in which the power supply is turned off; and a case of switching the operation mode from the image capturing mode to other operation modes.

As described above, in a case that the user views the back face monitor 15 from the upper side, such an arrangement allows the user to examine only the through image, which allows the user to check the composition of the image to be photographed. On the other hand, in a case that the user has tilted the digital camera 1, or in a case that the user views the back face monitor 15 from the lower side, such an arrangement allows the user to ascertain the camera information, in addition to examining the through image.

Also, an arrangement may be made in which, in the image capturing mode, a through image is displayed on the screen A, and an image which has already been captured is displayed on the screen B. With such an arrangement, the screen A displays a through image including the camera information in a superimposed form as described in FIG. 3B, and the screen B displays the most recently captured image that is stored in the external memory 28 or the internal memory 29, for example. Such an arrangement allows the user to instantly examine the image that had been captured and stored immediately before, without the need to switch the operation mode to the replay mode, which is a mode that allows the user to examine the captured images. Furthermore, such an arrangement allows the user to set the image capturing conditions (angle, the direction of the subject, the focal distance, etc.) for capturing an image while examining the image thus captured immediately before. This allows the user to effectively capture an image.

Also, an arrangement may be made in which, in the image capturing mode, the screen A displays a through image, and the screen B displays the information with respect to the settings and the status of the camera. With such an arrangement, the screen A displays the through image shown in FIG. 3A, and the screen B displays the information with respect to the image capturing setting information for the digital camera 1 (storage resolution, image compression ratio, ISO, white balance setting, shutter speed, aperture value, etc.), a histogram of the image displayed as the through image, etc., for example. FIG. 4C shows an example of the camera setting/status information thus displayed on the screen B. Such an arrangement allows the user to capture an image while immediately ascertaining the conditions of the camera for capturing an image as necessary without the need to operate any menu, dial, or the like. This allows the user to effectively capture an image. Also, with such an arrangement, the screen A preferably displays only the through image, or the through image including only the minimum necessary information in a superimposed form. With such an arrangement, the display of the through image does not become excessively complex. Note that the screen B may display only the camera setting/status information, or may display a through image including the camera setting/status information in a superimposed form.

[Image Display Mode]

With the digital camera 1 according to the present embodiment in the image display mode, in a case that the user views the display monitor 15 from the upper side (the direction of the arrow A), such an arrangement allows the user to observe only one captured image in a single-frame display format. On the other hand, in a case that the user views the display monitor 15 from the lower side (the direction of the arrow B), such an arrangement allows the user to observe multiple frames (e.g., four frames) of the captured images.

Figure 4A:
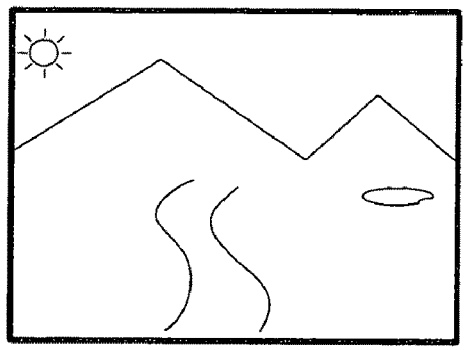
FIGS. 4A through 4C show examples of image data displayed on the back face monitor.
Figure 4B:
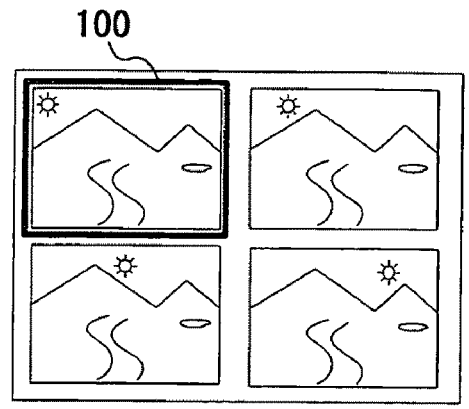
Figure 4C:
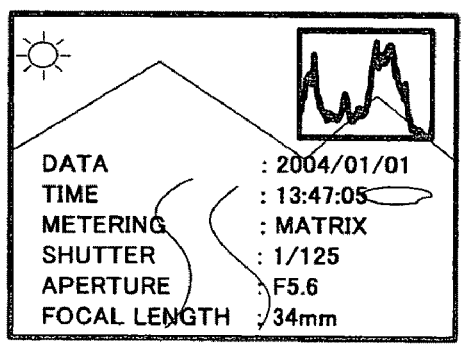

FIG. 4A shows an example of the screen A displayed on the back face monitor 15 in a case that the user views the digital camera 1 from the upper side (in the direction of the arrow A). FIG. 4B shows an example of the screen B displayed on the back face monitor 15 in a case that the user views the digital camera 1 from the lower side (in the direction of the arrow B). In a four-frame display format as shown in FIG. 4B, a selection frame 100 is displayed on the image data (selected image) which has been selected as the image to be displayed in a single-frame display format shown in FIG. 4A.

Upon pressing the cross key 14 in the upper direction, the image data that had been captured immediately before the image data (selected image) currently displayed on the screen A is displayed on the screen A in the single frame format. At this time, in the four-frame display screen displayed on the screen B, the selection frame 100 is moved to the image data that had been captured immediately before the image data currently selected, i.e., the data to be displayed on the screen A in the single-frame display format. On the other hand, upon pressing the cross key 14 in the lower direction, the image data that had been captured immediately after the image data (selected image) currently displayed on the screen A is displayed on the single frame screen. At this time, in the four-frame display screen displayed on the screen B, the selection frame 100 is moved to the image data that had been captured immediately after the image data currently selected, i.e., the data to be displayed on the screen A in the single-frame display format.

Description will be made with reference to the flowchart shown in FIG. 8 regarding the procedure of the replay screen update processing for switching the selected image and updating the images displayed on the screen A and the screen B on the back face monitor 15 according to the user's operation via the cross key 14.

Figure 8:
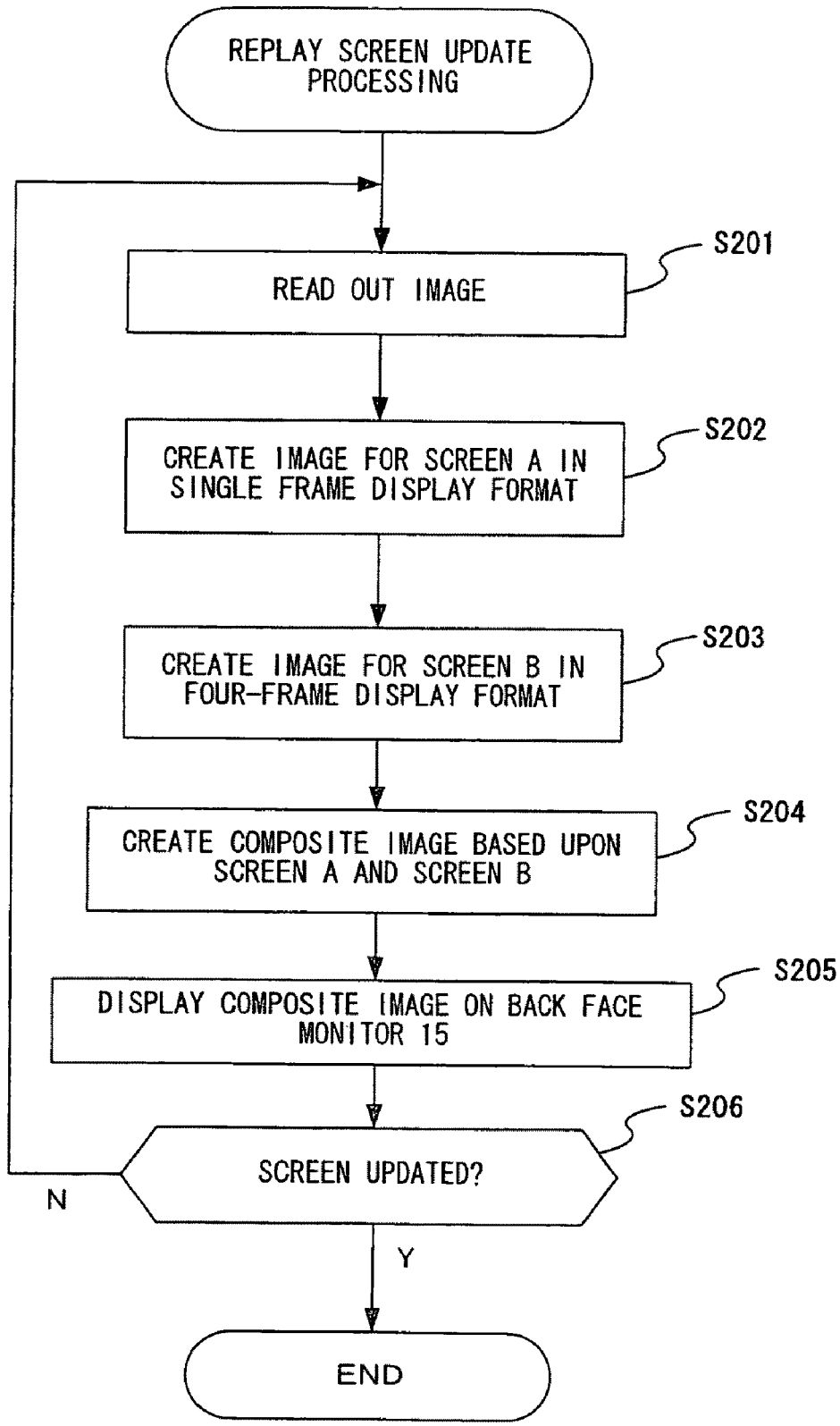
FIG. 8 is a flowchart for describing a processing procedure for updating a replay screen.

Upon switching the selected image according to the user's operation of pressing the cross key 14 in the upper or lower direction, a sub-routine of the replay screen update processing shown in FIG. 8 is started. In Step S201, the image processing unit 22 reads out the image data of the selected image from the external memory 28 or the internal memory 29. In Step S202, the image processing unit 22 creates the image data for the screen A which is to be displayed on the single frame display screen of the back face monitor 15. The image data for the screen A thus created is stored in the screen A region of the RAM 25.

In Step S203, the image processing unit 22 reads out the four image data sets, including the selected image, from the external memory 28 or the internal memory 29. Then, the image processing unit 22 reduces the size of these image data sets, which are to be displayed on a single screen in a four-frame display format. Then, the image processing unit 22 creates the image data for the screen B in which the selection frame 100 is superimposed on the selected image displayed in the four-frame display screen so as to surround the selected image. The image data for the screen B thus created is stored in the RAM 25.

In Step S204, the image processing unit 22 reads out the image data for the screen A and the image data for the screen B from the RAM 25, and creates composite image data based upon the image data for the screen A and the image data for the screen B. The composite image data thus created is stored in the display image region of the RAM 25. In Step S205, the monitor control unit 23 reads out the composite image data from the display image region of the RAM 25, and displays the composite image data on the back face monitor 15. Accordingly, the image on the screen A and the image on the screen B based upon the image data for the screen A and the image data for the screen B are displayed on the back face monitor 15 at the same time.

In Step S206, in a case that determination has been made that the images displayed on the screen A and the screen B have been updated according to the user's operation via the cross key 14, the replay screen update processing shown in FIG. 8 ends. On the other hand, in a case that the images thus displayed have not been updated, the flow returns to Step S201.

As described above, such an arrangement allows the user to examine the captured image in the single frame display format by viewing the back face monitor 15 from the upper side (in the direction of the arrow A). Furthermore, in a case that the user has tilted the digital camera 1, or in a case that the user has changed viewpoints and views the back face monitor 15 from the lower side (in the direction of the arrow B), such an arrangement allows the user to examine multiple frames (e.g., four frames) of captured images at the same time.

[Menu Mode]

With the digital camera 1 according to the present embodiment, in a case that the user views the back face monitor 15 from the upper side (in the direction of the arrow A) in the menu mode, such an arrangement allows the user to observe a first menu. On the other hand, in a case that the user views the back face monitor 15 from the lower side (in the direction of the arrow B), such an arrangement allows the user to observe a second menu.

Figure 5A:
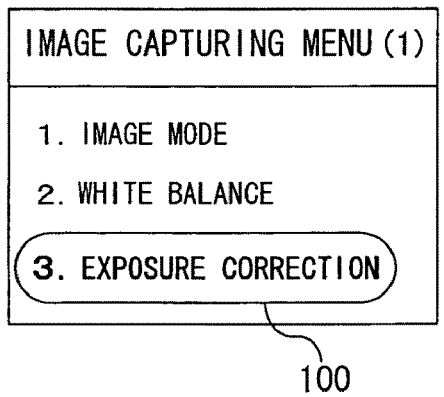
FIGS. 5A through 5D show examples of menu images displayed on the back face monitor.
Figure 5B:
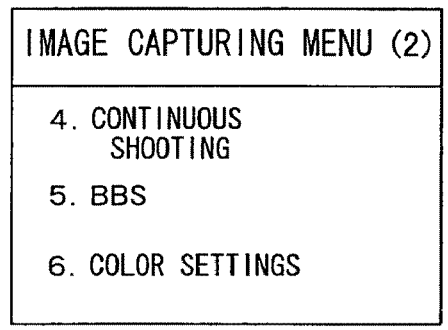

FIG. 5A shows an example of the screen A displayed on the back side monitor 15 in a case that the user views the digital camera 1 from the upper side (in the direction of the arrow A). On the other hand, FIG. 5B shows an example of the screen B displayed on the back face monitor 15 in a case that the user views the digital camera 1 from the lower side (in the direction of the arrow B). In the first and second menus displayed on the screens A and B, the selection frame 100 is displayed superimposed on a selected menu item. Such an arrangement allows the user to move the selection frame 100 by operating the cross key 14.

In the examples shown in FIGS. 5A and 5B, the menu mode has six menu items. Specifically, the screen A displays the first menu including three menu items (1. image mode, 2. white balance, 3. exposure correction). Also, the screen B displays the second menu including three menu items (4. continuous shooting, 5. BBS, 6. color settings). Such an arrangement allows the user to move the selection frame 100 by operating the cross key 14, thereby allowing a desired menu item to be selected. Subsequently, upon pressing the decision button 14a of the cross key 14, the change processing for the camera settings represented by the menu item thus selected is executed.

Figure 6A:
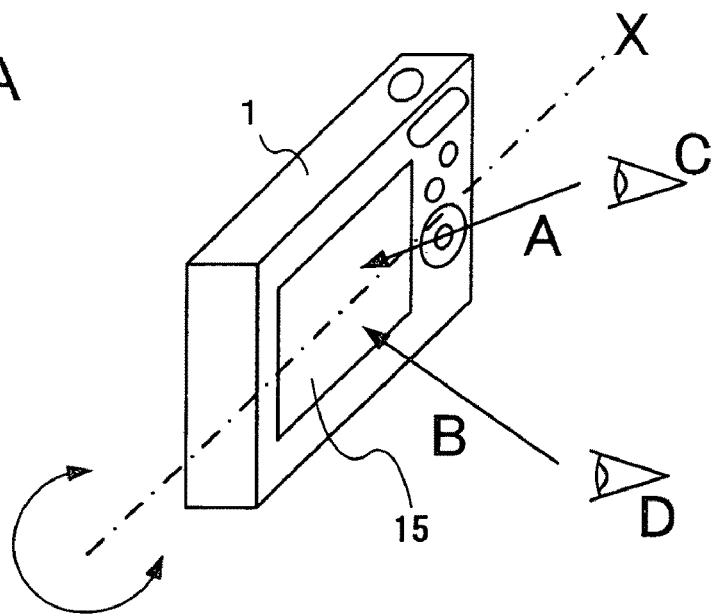
FIGS. 6A and 6B are perspective views showing the digital camera in the level state and the digital camera in a tilt state, respectively.
Figure 6B:
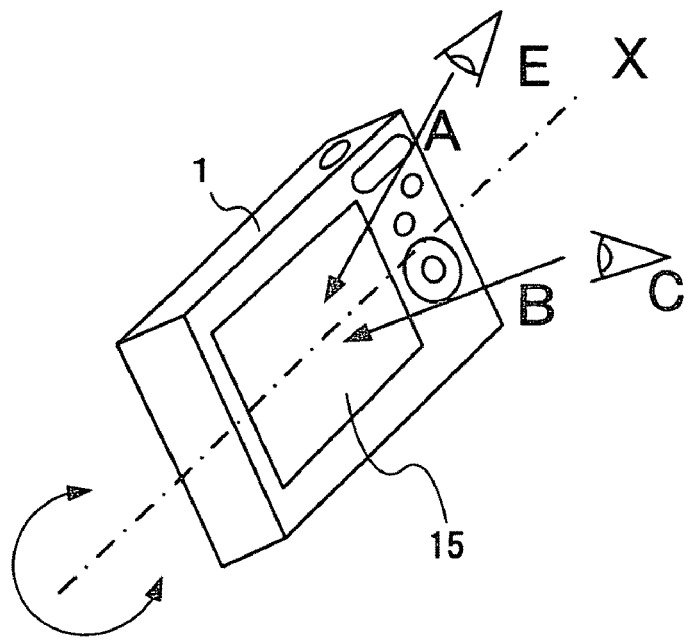

The digital camera 1 has a function of detecting the level state, in which the display face of the back face monitor 15 is approximately parallel to the direction of gravity, and the tilt state, in which the display face of the back face monitor 15 is tilted with respect to the direction of gravity. FIG. 6A is a perspective view which shows the digital camera 1 in the level state. FIG. 6B is a perspective view which shows the digital camera 1 in the tilt state.

In a case that the digital camera 1 is in the level state, the selection frame 100 is displayed on the first menu displayed on the screen A. On the other hand, in a case that the digital camera 1 is in the tilt state, the selection frame 100 is displayed on the second menu displayed on the screen B.

In a case that the digital camera 1 is in the level state in the menu mode as shown in FIG. 6A, and in a case that the user C views the back face monitor 15 along the direction of the arrow A, such an arrangement allows the user C to observe the first menu displayed on the screen A shown in FIG. 5A. In the example of the menu thus displayed shown in FIG. 5A, the menu item (3. exposure correction) is selected from among the menu items, and the selection frame 100 is superimposed on the selected menu item. On the other hand, the screen B displays the second menu shown in FIG. 5B.

Figure 5C:
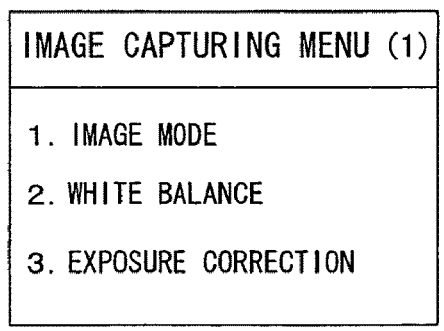
Figure 5D:
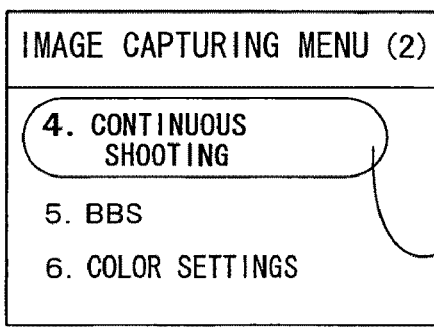

Then, let us consider a case in which the user has tilted the digital camera 1, and the camera is in the tilt state. In this case, the user C views the back face monitor 15 along the direction of the arrow B as shown in FIG. 6B. Accordingly, the user C observes the second menu displayed on the screen B as shown in FIG. 5D. With the digital camera 1, in a case that the attitude sensor 31 has detected a change in the attitude from the level state to the tilt state, the selection frame 100, which has been displayed on the screen A, is moved so as to be positioned over the top menu item (4. continuous shooting) of the second menu displayed on the screen B. At this time, the screen A displays the first menu shown in FIG. 5C.

On the other hand, in a case that the attitude of the digital camera 1 has been changed from the tilt state to the level state, the selection frame 100 thus displayed on the screen B is moved to the first menu displayed on the screen A. In this case, the selection frame 100 is moved so as to be positioned over the bottom menu item (3. exposure correction) of the first menu.

Description will be made regarding the processing procedure of the menu processing for displaying the first and second menus on the screens A and B with reference to the flowchart shown in FIG. 9.

In Step S301, the image processing unit 22 reads out the first menu screen information from the EEPROM 27, and creates the image data for the screen A based upon the first menu screen information. Furthermore, the image processing unit 22 reads out the second menu screen information from the EEPROM 27, and creates the image data for the screen B based upon the second menu screen information. The image data for the screen A and the image data for the screen B are stored in the image A region and the image B region of the RAM 25, respectively. Note that the setting is made such that the selection frame 100 is superimposed on the first menu item of the first menu.

In Step S302, the image processing unit 22 reads out the image data for the screen A and the image data for the screen B, and combines the image data for the screen A and the image data for the screen B, thereby creating composite image data. The composite image data thus created is stored in the composite image region of the RAM 25. The monitor control unit 23 reads out the composite image data from the RAM 25, and displays the composite image on the back face monitor 15. Such an arrangement allows the back face monitor 15 to display the screen A and the screen B at the same time based upon the image data for the screen A and the image data for the screen B.

In Steps S303 through S305, determination is made whether or not the attitude of the digital camera 1 has changed from the tilt state to the level state, whether or not the attitude of the digital camera 1 has changed from the level state to the tilt state, and whether or not the cross key 14 has been operated in the upper direction or the lower direction.

In a case that determination has been made in Step S303 that the attitude of the digital camera 1 has changed from the tilt state to the level state, the flow proceeds to Step S306. In Step S306, the setting is made such that the selection frame 100 is superimposed on the bottom menu item of the first menu displayed on the screen A, whereupon the flow proceeds to Step S309.

In a case of "NO" in Step S303, the flow proceeds to Step S304. In a case that determination has been made in Step S304 that the attitude of the digital camera 1 has changed from the level state to the tilt state, the flow proceeds to Step S307. In Step S307, the setting is made such that the selection frame 100 is superimposed on the top menu item of the second menu displayed on the screen B, whereupon the flow proceeds to Step S309.

In a case of "NO" in Step S304, the flow proceeds to Step S305. In a case that determination has been made in Step S305 that the cross key 14 has been operated in the upper or lower direction, the flow proceeds to Step S308. In a case that the cross key 14 has been operated in the upper direction, the setting is made in Step S308 such that the selection frame 100 is moved upward to the first menu item up from the menu item currently selected. On the other hand, in a case that the cross key 14 has been operated in the lower direction, the setting is made such that the selection frame 100 is moved downward to the first menu item down from the menu item currently selected. Subsequently, the flow proceeds to Step S309.

In a case of "NO" in Step S305, i.e., in a case that the attitude of the digital camera 1 has not been changed, and in a case that the cross key 14 has not been operated in the upper or lower direction, the flow proceeds to Step S311.

In Step S309, the image processing unit 22 reads out the first menu screen information from the EEPROM 27, and creates the image data for the screen A based upon the first menu screen information. Furthermore, the image processing unit 22 reads out the second menu screen information from the EEPROM 27, and creates the image data for the screen B based upon the second menu screen information. The image data for the screen A and the image data for the screen B thus created are stored in the screen A region and the screen B region of the RAM 25, respectively. Note that the selection frame 100 is superimposed on the image data for the screen A or the image data for the screen B so as to surround the menu item thus set in each of Steps S306 through S308.

In Step S310, the image processing unit 22 reads out the image data for the screen A and the image data for the screen B from the RAM 25, and combines the image data for the screen A and the image data for the screen B, thereby creating composite image data. The composite image data thus created is stored in the composite image region of the RAM 25. The monitor control unit 23 reads out the composite image data from the RAM 25, and displays the composite image data on the back face monitor 15. Such an arrangement allows the back face monitor 15 to display the image for the screen A and the image for the screen B at the same time based upon the image data for the screen A and the image data for the screen B, respectively.

In Step S311, determination is made whether or not the decision button 14a of the cross key 14 has been pressed. In a case that the decision button 14a of the cross key 14 has been pressed, the flow proceeds to Step S312. On the other hand, in a case that the decision button 14a of the cross key 14 has not been pressed, the flow proceeds to Step S313. In step S312, setting processing is performed according to the menu item thus selected via the selection frame 100. In Step S313, determination is made whether or not the operation mode is to be switched from the menu mode to any one of other operation modes. In a case that the operation mode is to be switched from the menu mode to any one of the other operation modes, the menu processing ends. On the other hand, in a case that the setting has been made such that the menu mode is to be continued, the flow returns to Step S303.

As described above, such an arrangement allows the user to examine the first menu by viewing the back face monitor 15 from the upper side (in the direction of the arrow A). Also, such an arrangement allows the user to examine the second menu immediately after examining the first menu by tilting the digital camera 1, or by shifting viewpoints and viewing the back face monitor 15 from the lower side (in the direction of the arrow B).

Furthermore, the digital camera 1 has a function of detecting whether the digital camera 1 is in the level state or in the tilt state. With such an arrangement, the selection frame 100 is moved between the first menu displayed on the screen A and the second menu displayed on the screen B according to the detection results. This allows the user to select a menu item quickly.

Description has been made regarding the digital camera 1 according to an embodiment to which the present invention has been applied. However, the present invention is not restricted to such an embodiment. Description will be made below regarding modifications of the embodiment according to the present invention.

[Modification 1]

Let us consider a case in which there are many menu items included in the menu mode, such that the menu items cannot all be contained in the first menu and the second menu, i.e., a case in which three or more menu pages are required to contain the menu items. In this case, an arrangement may be made having a function of scrolling the menu screen pages displayed on the screens A and B according to the change in the attitude of the digital camera 1. For example, an arrangement may be made in which, upon returning the attitude of the digital camera 1 from the tilt state to the level state, the menu screen pages displayed on the screen A and the screen B are scrolled.

With the digital camera 1 according to the modification 1 in the menu mode, a total of six menu items can be displayed on the screens A and B. Here, let us say that the first menu includes the menu items 1 through 3, and the second menu includes the menu items 4 through 6, as shown in FIGS. 5A and 5B. Furthermore, let us say that the third menu includes the menu items 7 through 9, and the fourth menu includes the menu item 10 through 12. The total number of menu screen pages is determined based upon the number of menu items.

Figure 9:
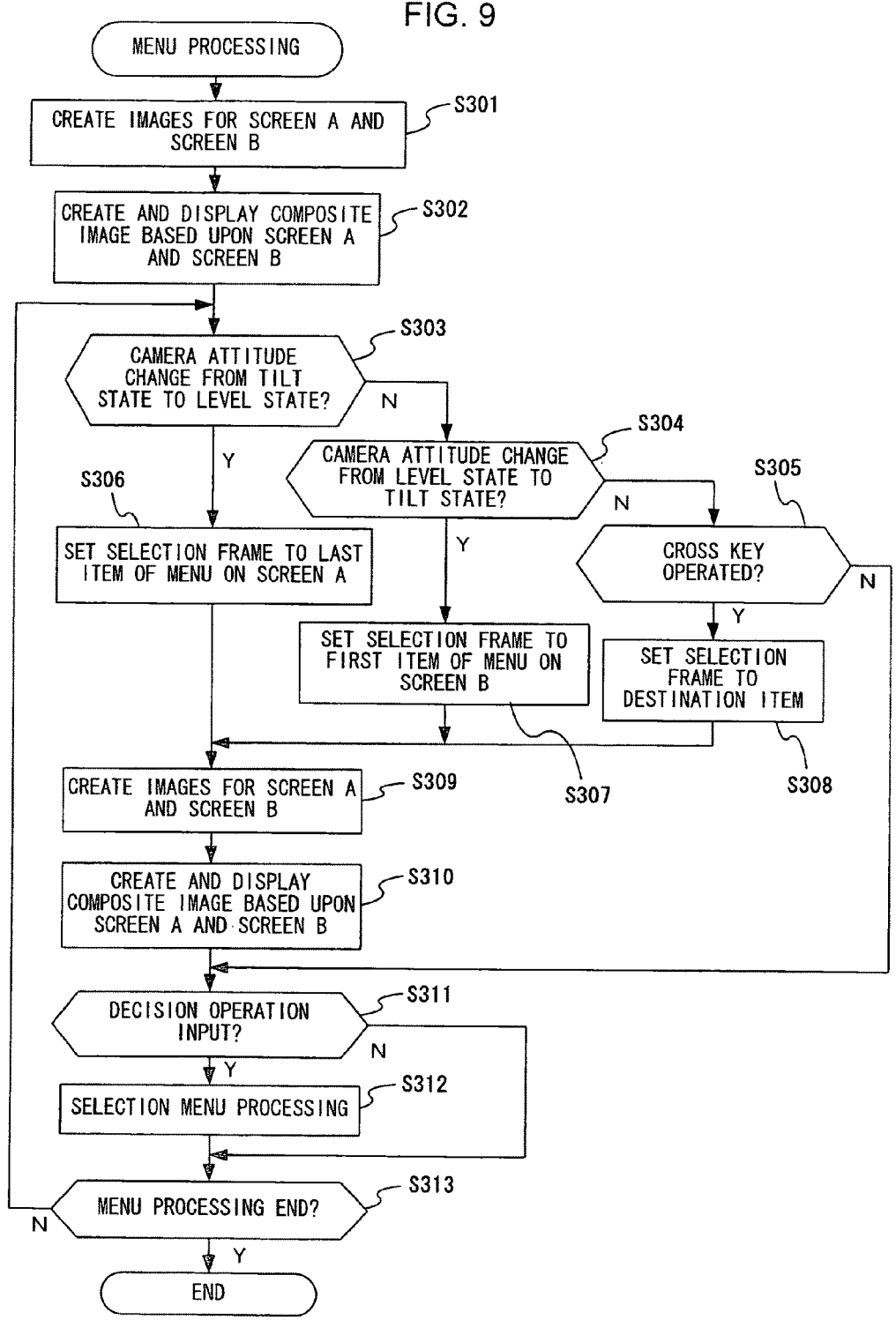
FIG. 9 is a flowchart for describing a processing procedure for menu processing.
Figure 10:
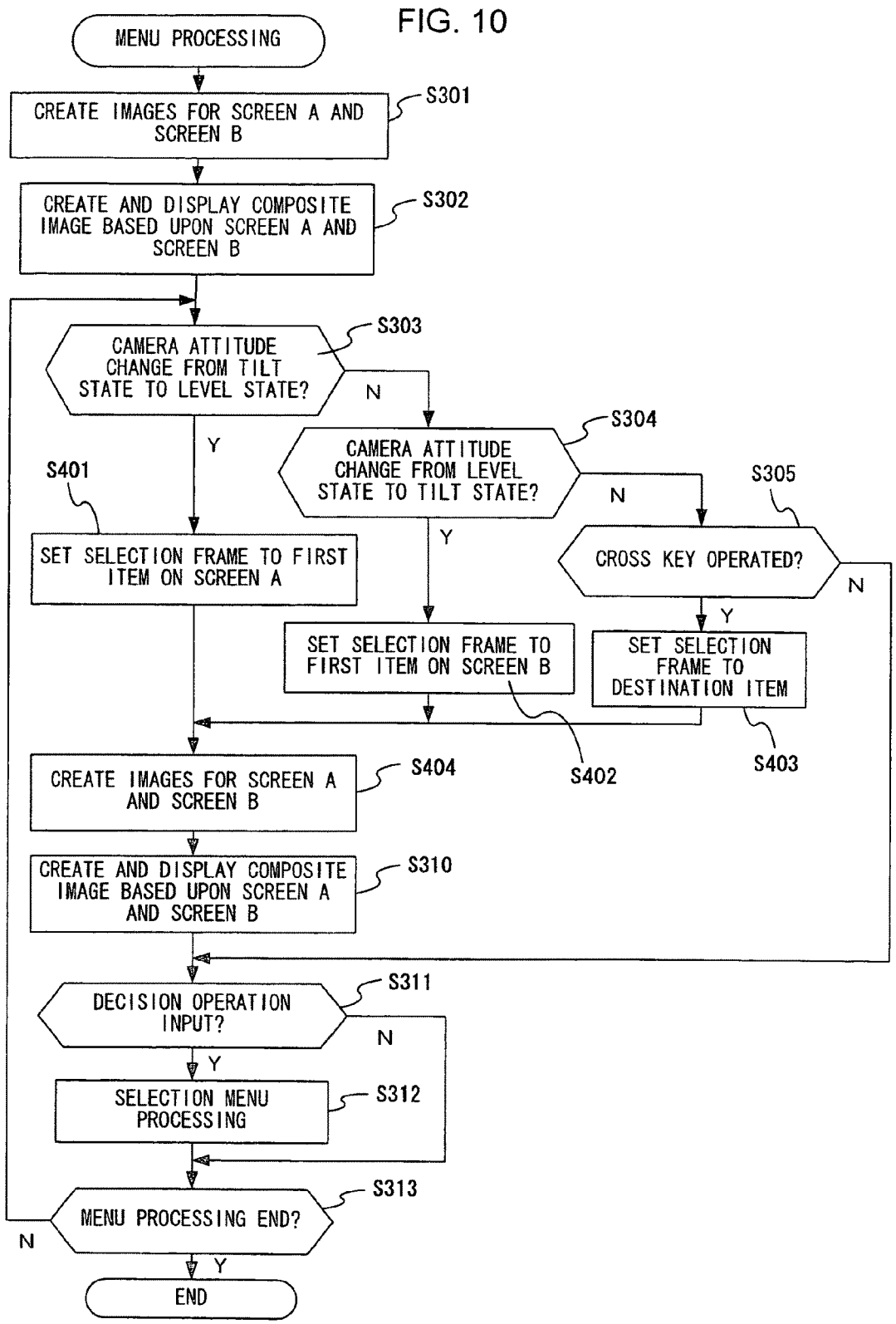
FIG. 10 is a flowchart for describing a processing procedure for menu processing according to a modification 1.

The modification 1 provides a menu processing procedure that differs from the procedure described above with reference to the flowchart shown in FIG. 9. Description will be made regarding the processing procedure of the menu processing according to the modification with reference to the flowchart shown in FIG. 10. Note that the same steps as those in the menu processing shown in FIG. 9 are denoted by the same step numbers, and description thereof will be omitted. Description will be made below mainly regarding the points of difference from the processing shown in FIG. 9.

In a case that determination has been made in Step S303 that the attitude of the digital camera 1 has changed from the tilt state to the level state, the flow proceeds to Step S401. In Step S401, the menu screen two frames after the menu screen that had been currently displayed on the screen A is displayed on the screen A. On the other hand, the menu screen two frames after the menu screen that had been currently displayed on the screen B is displayed on the screen B. Furthermore, after switching of the menu screens, the selection frame 100 is displayed on the top menu item of the screen A, whereupon the flow proceeds to Step S404. For example, let us consider a case in which, in the current stage, the first menu is displayed on the screen A, and the second menu is displayed on the screen B. In this case, in Step S401, the third menu is displayed on the screen A, and the fourth menu is displayed on the screen B. Furthermore, the setting is made such that the selection frame 100 is displayed on the top menu item of the third menu, which is displayed on the screen A.

In a case of "NO" in Step S303, the flow proceeds to Step S304. In a case that determination has been made in Step S304 that the attitude of the digital camera 1 has changed from the level state to the tilt state, the flow proceeds to Step S402. In Step S402, the setting is made such that the selection frame 100 is displayed on the top menu item of the menu screen displayed on the screen B, whereupon the flow proceeds to Step S404.

In a case of "NO" in Step S304, the flow proceeds to Step S305. In a case that determination has been made in Step S305 that the cross key 14 has been operated in the upper direction or the lower direction, the flow proceeds to Step S403. In a case that the cross key 14 has been operated in the upper direction, the setting is made in Step S403 such that the selection frame 100 is moved upward to the first item up from the menu item currently selected. On the other hand, in a case that the cross key 14 has been operated in the lower direction, the setting is made such that the selection frame 100 is moved downward to the first item down from the menu item currently selected. Subsequently, the flow proceeds to Step S404.

Let us consider a case in which the setting has been made in Step S401 such that the menu screens displayed on the screen A and the screen B have been switched. In this case, in Step S404, the menu screen information is read out from the EEPROM 27 for displaying the screen A, and the image data for the screen A is created based upon the menu screen information. Furthermore, the menu screen information is read out from the EEPROM 27 for displaying the screen B, and the image data for the screen B is created based upon the menu screen information. The image data for the screen A and the image data for the screen B are stored in the screen A region and the screen B region of the RAM 25. Note that, at this time, the selection frame 100 is superimposed on the image for the screen A or the image for the screen B so as to surround the menu item selected in each of Steps S401 through S403.

As described above, such an arrangement allows the user to quickly scroll through each of the menu screen pages by changing the attitude of the digital camera 1 from the tilt state to the level state.

Note that an arrangement may be made in which, in the image display mode, the first image is displayed on the screen A in a single frame display format, and the second image is displayed on the screen B in a single frame display format. Furthermore, let us consider a case in which there are three or more display images (captured images). In this case, an arrangement may be made in which images to be displayed on the screens A and B are scrolled upon returning the attitude of the digital camera 1 from the tilt state to the level state. With such an arrangement, in the same way as the page scrolling for the menu screens described above, upon changing the attitude of the digital camera 1 from the tilt state to the level state, the image data captured two frames before the image data that had been currently displayed on the screen A is displayed on the screen A. Furthermore, the image data captured two frames before the image data that had been currently displayed on the screen B is displayed on the screen B.

Such an arrangement allows the user to quickly scroll the display images to the screens by changing the attitude of the digital camera 1 from the tilt state to the level state. As described above, such an arrangement allows the user to quickly ascertain multiple pages of the information with respect to the digital camera, such as multiple pages of the menu items and multiple pages of the captured images, without the need to operate any operation member.

[Modification 2]

Also, an arrangement may be made in which a captured image is displayed on the screen A in a single frame display format, and the image information attached to the image data thus displayed on the screen A is displayed on the screen B.

With the digital camera 1 according to the modification 2 in the image display mode, in a case that the user views the back face monitor 15 from the upper side (in the direction of the arrow A), such an arrangement allows the user to observe the captured image in the single display format. On the other hand, in a case that the user views the display monitor 15 from the lower side (in the direction of the arrow B), such an arrangement allows the user to observe the image in the single frame display format, where the image information attached to the image has been superimposed on the image.

The term "image information" as used here represents the information described in the file header such as the image capturing information etc., as described above, the histogram of the image, etc. Note that the image information thus displayed is not restricted to such information. Rather, any information may be employed as long as the information has been attached to the image, or as long as the information is associated with the image. FIG. 4A shows an example of the screen A displayed on the back face monitor 15 in a case that the user views the digital camera 1 from the upper side (in the direction of the arrow A). On the other hand, FIG. 4C shows an example of the screen B displayed on the back face monitor 15 in a case that the user views the digital camera 1 from the lower side (in the direction of the arrow B). With such an arrangement, the image data thus displayed on the screen A in a single frame format is set to the selected image.

When the cross key 14 is operated by pressing in the upper direction, the image data which had been captured one frame before the image data currently displayed on the screen A is set to be the selected image which is to be displayed in the single frame display format. On the other hand, when the cross key 14 is operated by pressing in the lower direction, the image data which had been captured one frame after the image data currently displayed on the screen A is set to be the selected image which is to be displayed in the single frame display format.

After the selected image has been changed, replay screen update processing is started. Description will be made regarding the processing procedure of the replay screen update processing with reference to the flowchart shown in FIG. 11.

In a case that the user has performed operation of the cross key 14 in the image display mode by pressing in the upper or lower direction, the selected image is changed, and the replay screen update processing sub-routine is started. First, in Step S501, the image processing unit 22 reads out the image data of the selected image from the external memory 28 or the internal memory 29. In Step S502, the image processing unit 22 creates the image data for the screen A, which is to be displayed on the screen A of the back face monitor 15 in a single frame display format, based upon the image data thus read out in Step S501. The image data for the screen A thus created is stored in the screen A region of the RAM 25.

Next, in Step S503, the image processing unit 22 reads out the image data for the screen A from the RAM 25, and superimposes the image information that is attached to the selected image on the image data for the screen A, thereby creating the image data for the screen B. The image data for the screen B thus created is stored in the screen B region of the RAM 25. Note that, in Step S503, the image processing unit 22 may create the image data for the screen B such that it only displays the image information.

In Step S504, the image processing unit 22 reads out the image data for the screen A and the image data for the screen B from the RAM 25, and combines the image data for the screen A and the image data for the screen B, thereby creating composite image data. The composite image data thus created is stored in the display image region of the RAM 25. In Step S505, the monitor control unit 23 reads out the composite image data from the display image region of the RAM 25, and displays the composite image data on the back face monitor 15. Thus, the back face monitor 15 displays the screen A based upon the image data for the screen A and the screen B based upon the image data for the screen B at the same time.

In a case that determination has been made in Step S506 that the images thus displayed on the screens A and B have been updated according to the user's operation via the cross key 14, the replay screen update processing shown in FIG. 11 ends. On the other hand, in a case that the updating of the images thus displayed has not been completed, the flow returns to Step S501.

As described above, in a case that the user views the back face monitor 15 from the upper side (in the direction of the arrow A), such an arrangement allows the user to observe the captured image in a single screen display format. Furthermore, upon the user tilting the digital camera 1, or upon the user shifting viewpoints and viewing the back face display 15 in the direction of the arrow B, such an arrangement allows the user to immediately ascertain the image information with respect to the image thus displayed in the single frame display format.

The present invention is not restricted to the above-described embodiment, and the modifications 1 and 2.

Description has been made in the above-described embodiment and modifications 1 and 2 regarding an arrangement in which the back face monitor 15 has a configuration of allowing the user to observe various screens that change when the direction along which the user views the back face monitor 15 of the digital camera 1 changes between the upper direction and the lower direction. However, the present invention is not restricted to such an arrangement. Also, an arrangement may be made in which the back face monitor 15 has a configuration of allowing the user to observe various screens that change when the direction along which the user views the back face monitor 15 of the digital camera 1 changes between the left direction and the right direction. Also, an arrangement may be made in which the back face monitor 15 has a configuration of allowing the user to observe various screens that change when the direction along which the user views the back face monitor 15 of the digital camera 1 changes among the front direction, the upper direction, the lower direction, the left direction, and the right direction.

Description has been made regarding an arrangement in which the image processing unit 22 creates the image data for the screen A, and in the following step, the image data for the screen B. However, the present invention is not restricted to such an arrangement. Also, an arrangement may be made including two image processing units, i.e., a first image processing unit for creating the image data for the screen A and a second image processing unit for creating the image data for the screen B. Such an arrangement including the two image processing units enables the image data for the screen A and the image data for the screen B to be created in parallel, thereby improving the display update speed.

Note that the present invention may be applied to an image capturing or image display device such as an interchangeable lens digital single lens reflex camera, or a digital video camera, or the like.

Description will be made below regarding other modifications of the embodiment according to the present invention.
[Modification 3]

Figures 12A, 12B:
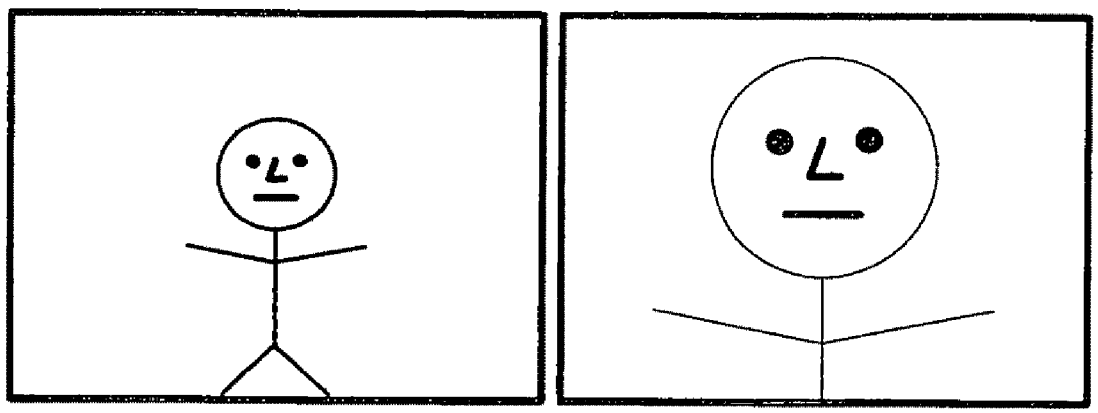
FIGS. 12A and 12B show examples of the screens A and B displayed on the back face monitor according to a modification 3.

Let us consider a case in which the digital camera 1 has an electronic zoom function. In this case, an arrangement may be made in which, in the image capturing mode, a through image is displayed on the screen A, and the through image electronically zoomed is displayed on the screen B. FIG. 12A shows an example of the screen A displayed on the back face monitor 15. FIG. 12B shows an example of the screen B displayed on the back face monitor 15.

The image processing unit 22 creates the image data for the screen A based upon the image signal acquired by the image sensor 21, and stores the image data for the screen A thus created in the screen A region of the RAM 25. Next, the image processing unit 22 trims the image data for the screen A thus created, according to the magnification of the electronic zoom set by the user's operation via the zoom button 11. Then, the image processing unit 22 resizes the image data thus trimmed. The image data thus resized is stored in the screen B region of the RAM 25. Furthermore, the image data for the screen A and the image data for the screen B are subjected to processing by the monitor control unit 23, and are displayed on the back face monitor 15.

Also, an arrangement may be made in which the screen A displays a through image with the current angle of view, and the screen B displays the through image with an intermediate angle of view or with the angle of view that corresponds to the telephoto end of the optical zoom, which is obtained by trimming and resizing the image data for the screen A. Note that the term "intermediate angle of view" as used here represents an intermediate angle of view between the angle of view that corresponds to the wide-angle end of the optical zoom and the angle of view that corresponds to the telephoto end of the optical zoom.

Figures 13A, 13B:
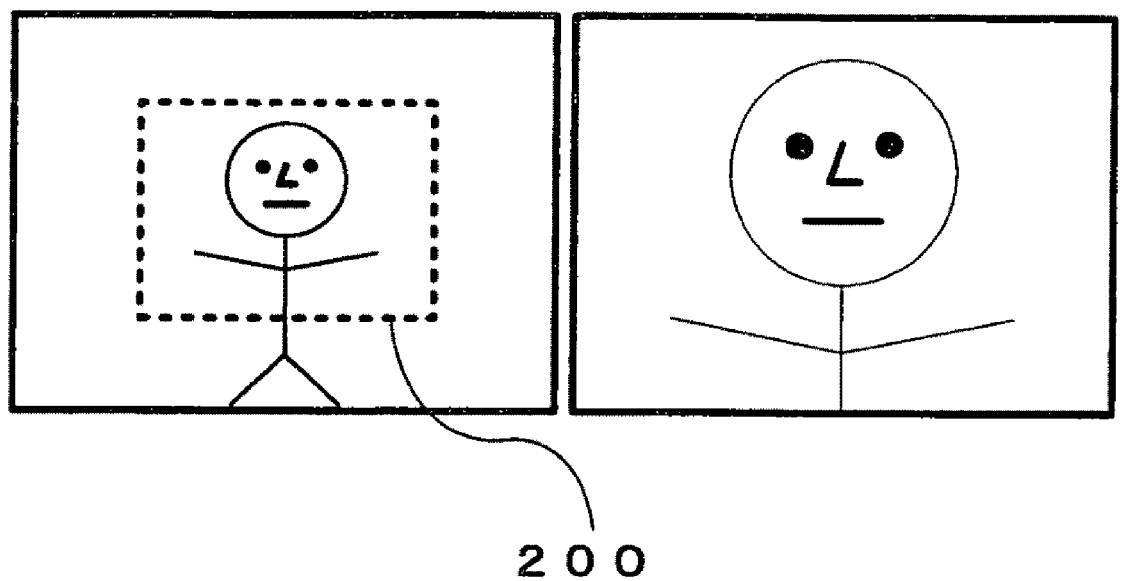
FIGS. 13A and 13B show examples of the screens A and B displayed on the back face monitor according to a modification 3.

Description will be made regarding an arrangement in which the screen A displays a captured image (through image) with the angle of view that corresponds to the current optical zoom level, and the screen B displays the through image with the angle of view that electronically corresponds to the telephoto end of the optical zoom. FIG. 13A shows an example of the screen A displayed on the back face monitor 15. FIG. 13B shows an example of the screen B displayed on the back face monitor 15. Note that the region (trimming region 200) surrounded by the dotted line represents the region displayed on the screen B.

The image processing unit 22 creates the image data for the screen A based upon the image signal acquired by the image sensor 21, and stores the image data thus created in the screen A region of the RAM 25. The control unit 20 calculates the trimming region 200 based upon the image capturing angle of view of the current optical zoom level, such that the image thus trimmed corresponds to the image as captured with a predetermined angle of view (the angle of view that corresponds to the telephoto end of the optical zoom). The image processing unit 22 reads out the image data for the screen A from the RAM 25, and trims the image data thus read out so as to extract the image data of the trimming region 200. Then, the image processing unit 22 resizes the image data of the trimming region 200 such that the size of the trimming region 200 matches a size suitable for the image data to be displayed on the back face monitor 15. The image data thus resized is stored in the screen B region of the RAM 25. The image data for the screen A and the image data for the screen B are subjected to processing by the monitor control unit 23, and are displayed on the back face monitor 15.

Now, let us consider a case in which the image capturing angle of view of the current optical zoom level is equal to or greater than the angle of view of the through image which is to be displayed on the screen B. In this case, trimming processing is not performed for the image data for the screen A. Instead of the trimming processing, the image processing unit 22 stores the image data for the screen A in the screen B region of the RAM 25 as the image data for the screen B.

Such an arrangement allows the user to ascertain an appropriate zoom position without involving the optical zoom.

Also, an automatic zoom function may be assigned to the function button 16. With such an arrangement, upon detection of the user's operation via the function button 16 being pressed, the control unit 20 drives the zoom lens of the photographic optical system 32 by controlling the lens control unit 33 so as to perform optical zooming such that the angle of view of the optical zoom matches the angle of view that corresponds to the image displayed on the screen B. Thus, the screen A displays the image captured via the optical zoom with the angle of view that matches the angle of view of the image displayed on the screen B.

[Modification 4]

Also, an arrangement may be made in which, in the image capturing mode, the screen A displays a through image and the camera information, and the screen B displays the through image and the subject image information.

The term "camera information" as used here represents the information that indicates the setting conditions of the camera such as the operation mode, the image storage destination setting, the storage resolution setting value, the flash mode, the number of frames which can be stored, etc. The term "subject information" as used here represents the information obtained by the control unit 20 or the image processing unit 22 by calculating the subject image data thus captured. Examples of such information include the histogram information, the subject recognition information, etc.

Figures 14A, 14B:
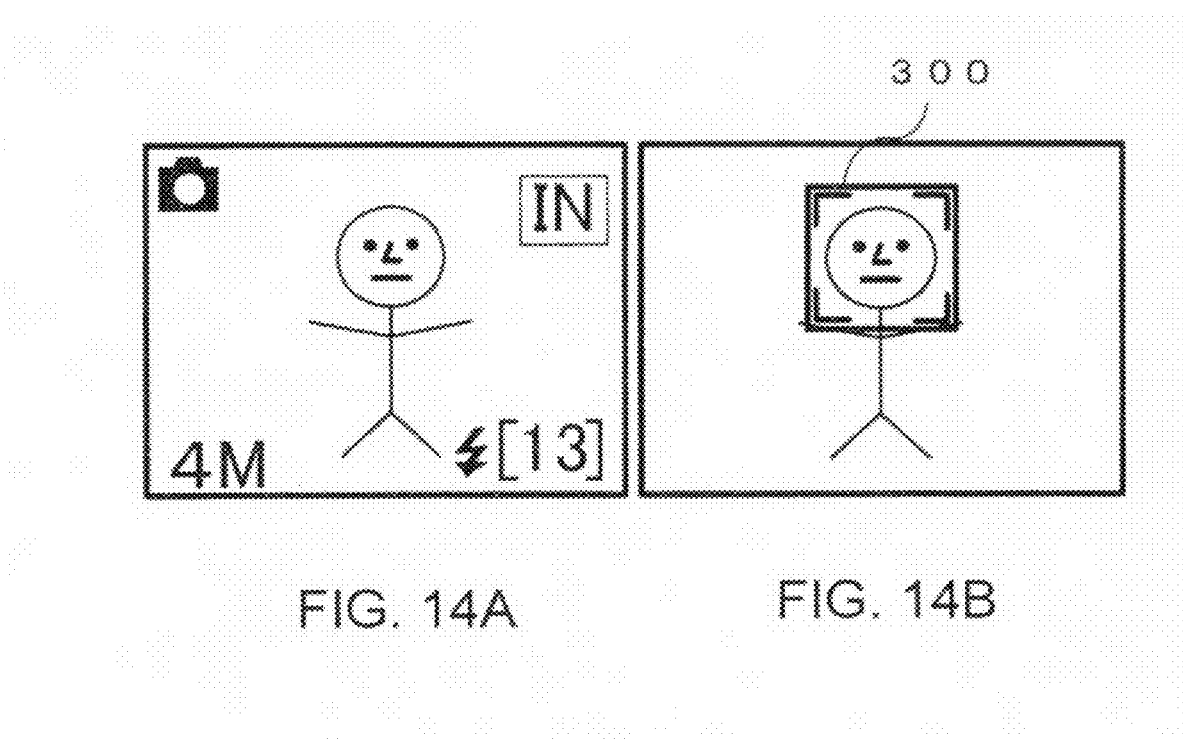
FIGS. 14A and 14B show examples of the screens A and B displayed on the back face monitor according to a modification 4.

Description will be made below regarding an arrangement in which a through image and the camera information are displayed on the screen A of the back face monitor 15, and the through image and the subject recognition information are displayed on the screen B thereof. FIG. 14A shows an example of the screen A displayed on the back face monitor 15. FIG. 14B shows an example of the screen B. Here, a face recognition mark 300 in FIG. 14B is a mark that indicates the position of a human face.

The image processing unit 22 superimposes the camera information acquired from the control unit 20 on the image data for the screen A created based upon the image signal acquired by the image sensor 21, thereby creating the image data for the screen A. Then, the image data for the screen A thus created is stored in the screen A region of the RAM 25. Furthermore, the image processing unit 22 detects whether or not there is a human face in the image data for the screen A by performing known face recognition processing for the image data for the screen A.

In a case that the image processing unit 22 has not detected a human face in the image data for the screen A, the image data processing unit 22 stores the image data for the screen A in the screen B region of the RAM 25. On the other hand, in a case that the image processing unit 22 has detected a human face, the image processing unit 22 superimposes the face recognition mark 300 on the face region thus detected in the image data for the screen A as shown in FIG. 14B, and stores the image data thus processed in the screen B region of the RAM 25. The image data for the screen A and the image data for the screen B are processed by the control unit 23, and are displayed on the back face monitor 15. Note that the term "face recognition processing" as used here represents a known face recognition technique for detecting whether or not there is a human face in the image data based upon the eyes, the nose, the mouth, and the contours of the face, and the position relationship among these features.

Such an arrangement allows the information sets to be displayed in a distributed manner on the two screens, i.e., on the screen A and the screen B. This allows the user to quickly ascertain a great amount of information while avoiding complexity in the information display.

[Modification 5]

Also, an arrangement may be made in which, in the image capturing mode, the screen A displays a through image, and the screen B displays an image that simulates the through image as captured by the digital camera 1 with modified image capturing settings. For example, an arrangement may be made in which the screen A displays a through image captured with the exposure correction value currently set (e.g., the correction value of zero), and the screen B displays an image that simulates the through image as captured with the exposure correction value incremented (or decremented) by 1 level from the exposure correction value as currently set. Description will be made below regarding such an arrangement.

Figure 15A:
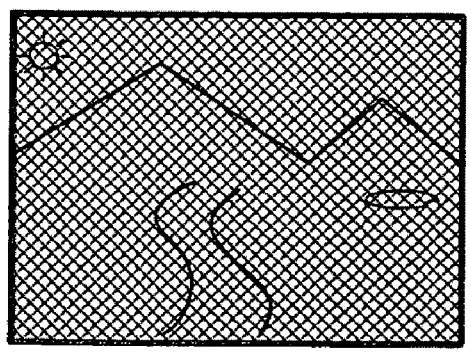
FIGS. 15A and 15B show examples of the screens A and B displayed on the back face monitor according to a modification 5.
Figure 15B:
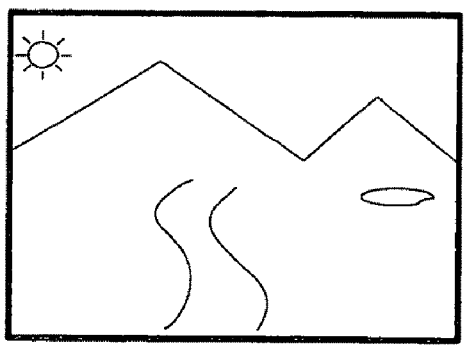

FIG. 15A shows an example of the screen A displayed on the back face monitor 15. FIG. 15B shows an example of the screen B displayed on the back face monitor 15.

The image processing unit 22 creates the image data for the screen A based upon the image signal acquired by the image sensor 21, and stores the image data for the screen A thus created in the screen A region of the RAM 25. Furthermore, the image processing unit 22 creates the image data for the screen B with the brightness increased from that of the image data for the screen A or the image signal acquired by the image sensor 21 by a value that corresponds to a predetermined correction level (e.g., 1 level). Then, the image data for the screen B thus created is stored in the screen B region of the RAM 25. The image data for the screen A and the image data for the screen B are processed by the monitor control unit 23, and are displayed on the back face monitor 15.

Such an arrangement allows the user to observe a through image displayed on the screen A, and to examine the image with a different brightness, thereby allowing the user to ascertain an appropriate exposure amount. Note that an arrangement may be made in which the image data for the screen B is created by simulating an image with other image capturing settings, e.g., the ISO sensitivity or the like, instead of the exposure setting value.

[Modification 6]

Also, an arrangement may be made in which, in the image capturing mode, the images each captured with different camera settings are displayed on the screen A and the screen B of the back face monitor 15, respectively, immediately after the image capturing. Examples of the camera settings include: exposure correction setting, ISO sensitivity setting, image quality adjustment, etc. Note that the term "image quality adjustment" as used here represents the setting of the image quality adjustment values used for the image processing device 22 for creating image data, examples of which include: the level of the edge enhancement, the contrast value, the color density, the hue, etc.

Description will be made with reference to the flowchart in FIG. 16 regarding an arrangement in which two images are consecutively captured, one of which is captured without exposure correction, and the other of which is captured with exposure correction.

Upon fully pressing the shutter release button 10, the flow proceeds to Step S601 where the image sensor 21 captures a first image of the subject without exposure correction. In the following Step S602, the image processing unit 22 processes the image signal output from the image sensor 21 so as to create the image data for the screen A which is to be displayed on the back face monitor 15, and the storage image data for the screen A which is to be stored in the external memory 28. In Step S603, the image data for the screen A and the storage image data for the screen A are stored in the screen A region of the RAM 25.

Step S604, determination is made again whether or not the shutter release button 10 has been fully pressed. In a case that the shutter release button 10 has not been fully pressed, the flow stands by in this step. In a case that the release button has been fully pressed again, the flow proceeds to Step S605. Note that an arrangement may be made in which, upon fully pressing the shutter release button 10 once, the images are automatically and serially captured. With such an arrangement, Step S604 can be eliminated.

In Step S605, the image sensor 21 captures a second image of the subject. In Step S605, the image capturing processing is performed using the exposure correction value set in advance while the first image has been captured without exposure correction. For example, let us consider a case in which the exposure correction value of −1 has been set. In this case, the second image is captured with an increased shutter speed, or a narrowed aperture, that differs by 1 level from that of the first image capturing processing.

In Step S606, the image processing unit 22 processes the image signal output from the image sensor 21 so as to create the image data for the screen B which is to be displayed on the back face monitor 15, and the storage image data for the screen B which is to be stored in the external memory 28. In Step S607, the image data for the screen B and the storage image data for the screen B are stored in the screen B region of the RAM 25. In Step S608, the image processing unit 22 reads out the image data for the screen A and the image data for the screen B from the RAM 25, creates a composite image based upon the image data for the screen A and the image data for the screen B, and stores the composite image in the display image region of the RAM 25. In Step S609, the monitor control unit 23 reads out the composite image data from the display image region of the RAM 25, and displays the composite image data on the back face monitor 15.

In Step S610, determination is made whether or not the cross key 14 has been operated in the left direction. In a case that the cross key 14 has been operated in the left direction, the flow proceeds to Step S611. In Step S611, the control unit 20 stores the storage image data for the screen A, which has been stored in the RAM 25, in the external memory 28, whereupon the process ends. On the other hand, in a case that the cross key 14 has not been operated in the left direction, the flow proceeds to Step S612. In Step S612, determination is made whether or not the cross key 14 has been operated in the right direction. In a case that the cross key 14 has been operated in the right direction, the flow proceeds to Step S613. In Step S613, the control unit 20 stores the storage image data for the screen B, which has been stored in the RAM 25, in the external memory 28, whereupon the process ends. On the other hand, in a case that the cross key 14 has not been operated in the right direction, the flow returns to Step S610.

As described above, with such an arrangement, two images are captured, each with different settings, one of which is captured without exposure correction, and the other of which is captured with exposure correction. Then, the two images, each thus captured with different settings, are displayed on the single back face monitor 15. Such an arrangement allows the user to make a comparison between the two images, each captured with different settings, which are displayed on the single back face monitor 15, specifically, on the screens A and B of the back face monitor 15. Furthermore, such an arrangement allows the user to store a desired image in the memory card 28 by operating the cross key 14 in the left or the right direction.

Let us consider an arrangement for capturing images with different ISO sensitivity settings. With such an arrangement, in Step S605 shown in FIG. 16, the second image is captured with a modified ISO sensitivity relative to the first captured image. On the other hand, let us consider an arrangement for capturing images with different image quality settings. With such an arrangement, in Step S605 shown in FIG. 16, the second image is captured with modified image quality settings relative to the first captured image.

Note that, with such an arrangement for capturing images with different image quality adjustment settings, the image capturing step may be performed only once. With such an arrangement, Steps S604 and Step S605 are eliminated from the flowchart shown in FIG. 16. Furthermore, in Step S606, the image processing unit 22 processes the image signal received from the image sensor 21 with image quality adjustment settings that differ from those used in the image processing in Step S602 so as to create the image data for the screen B and the storage image data for the screen B.

On the other hand, let us consider a case in which the digital camera 1 includes a vibration reduction mechanism. In this case, the setting which is to be modified for capturing images may be the ON/OFF setting of the vibration reduction mechanism. With such an arrangement, the image captured with the vibration reduction mechanism ON is displayed on the screen A. On the other hand, the image captured with the vibration reduction mechanism OFF is displayed on the screen B.

As described above, with the digital camera 1 having a function of modifying various image capturing setting conditions, such an arrangement allows the user to store a desired image after the user has examined multiple images each captured with different settings immediately after the images are thus captured.

[Modification 7]

Figures 17A, 17B:
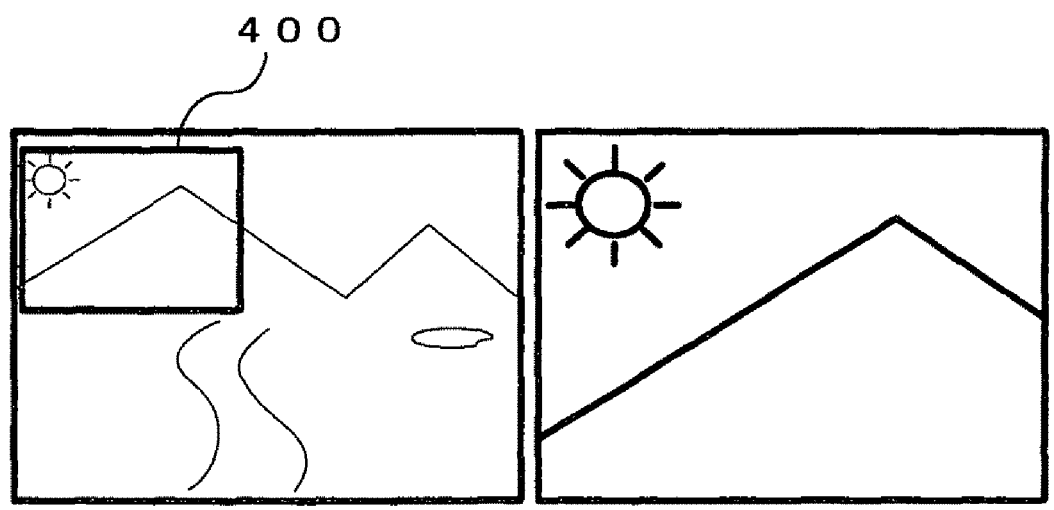
FIGS. 17A and 17B show examples of the screens A and B displayed on the back face monitor according to a modification 7.

Also, an arrangement may be made in which, in the image display mode, the screen A displays a captured image in a single frame display format, and the screen B displays a part of the image data that is displayed on the screen A in an enlarged form. FIG. 17A shows an example of the screen A displayed on the back face monitor 15. FIG. 17B shows an example of the screen B displayed on the back face monitor 15.

Let us consider a case in which the image data stored in the external memory 28 is displayed on the screen A of the back face monitor 15 in a single frame format. In this case, upon the zoom button 11 being operated by being pressed, the screen B displays an enlarged image with an electronic zoom magnification that corresponds to the user's operation via the zoom button 11. The region surrounded by an enlargement frame 400 indicates the enlargement region which is displayed on the screen B in an enlarged form. The position of the enlargement frame 400 in the screen A, that is, the are of the image to be displayed in an enlargement form can be selected through the operation of the cross key 14 by the user. Description will be made below regarding the processing for such an arrangement.

In the image display mode, the image processing unit 22 reads out the image data stored in the external memory 28, creates the image data for the screen A, and stores the image data for the screen A thus created in the screen A region and the screen B region of the RAM 25. In this stage, the same image is displayed on the screen A and the screen B. Next, upon the user operating the zoom button 11 and the cross key 14 so as to input instructions to select and enlarge a region of the image which the user wishes to enlarge, the image processing unit 22 trims the image data for the screen A so as to extract the region indicated by the enlargement region 400. The image data of the enlargement region 400 thus trimmed is resized to a size suitable for the size of the back face monitor 15, and the image data thus resized is then stored in the screen B region of the RAM 25 as the new image data for the screen B. The image processing unit 22 reads out the image data for the screen A and the image data for the screen B, and creates composite image data based upon the image data for the screen A and the image data for the screen B. Then, the monitor control unit 23 displays the composite image data having been thus subjected to the combining processing on the back face monitor 15.

Let us consider a case in which an enlarged image of the captured image is displayed on the screen B. In this case, an arrangement may be made in which, upon pressing the shutter release button 10, the image data of the region which has been obtained by trimming and which is indicated by the enlargement region 400 is stored in the external memory 28, in addition to the captured image displayed on the screen A. With such an arrangement, when an enlarged image is displayed, upon pressing the shutter release button 10, the image processing unit 22 trims the image data for the screen A so as to extract the region indicated by the enlargement region 400, thereby creating the trimmed image data. The trimmed image data thus created is stored in the external memory 28. The trimmed image data may be stored in the external memory after being resized to a size suitable for the size of the back face monitor 15.

As described above, with such an arrangement, the captured image and the enlargement of the captured image are displayed on the screens A and B of the back face monitor 15, respectively. Such an arrangement allows the user to immediately make a comparison between the captured image without resizing and the enlargement of the captured image. Furthermore, with such an arrangement, the enlargement frame 400 is displayed on the screen A, thereby allowing the user to immediately ascertain which region is to be extracted by trimming.

[Modification 8]

Also, an arrangement may be made in which, in the image display mode, the screen A displays the image data before image processing, and the screen B displays the image data after image processing. Examples of the image processing include: dark area tone correction processing, which is primarily for correcting the tone of a dark area in the image data; filter processing such as edge enhancement processing, color conversion processing, etc., and so forth.

Figure 18A:
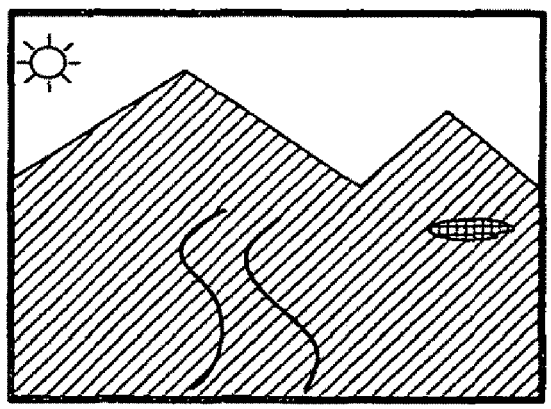
FIGS. 18A and 18B show examples of the screens A and B displayed on the back face monitor according to a modification 8.
Figure 18B:
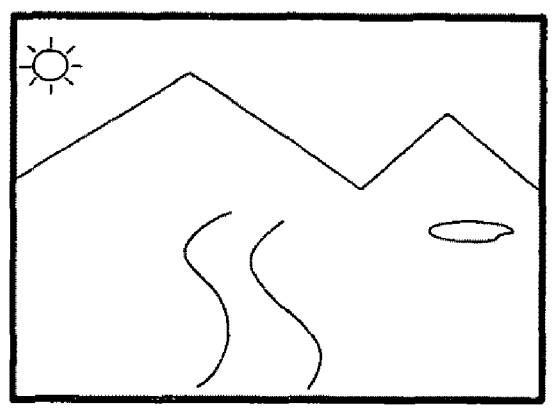

Description will be made regarding an arrangement which performs dark area tone correction processing for the image data. FIG. 18A shows an example of the screen A displayed on the back face monitor 15. FIG. 18B shows an example of the screen B displayed on the back face monitor 15.

Let us consider a case in which the image data of the captured image stored in the external memory 28 is displayed on the screen A of the back face monitor 15 in a single frame display format. In this case, upon pressing the function button 16, the screen B displays the image data as subjected to the dark area tone correction processing. The hatched region shown in FIG. 18A corresponds to the dark area which is to be subjected to the dark area tone correction processing.

In the image display mode, first, the control unit 20 reads out the image data of the captured image stored in the external memory 28, and stores the image data thus read out in the RAM 25. The image processing unit 22 processes the image data thus stored in the RAM 25 so as to create the image data for the screen A, and stores the image data for the screen A thus created in the screen A region and the screen B region of the RAM 25. In this stage, the screen A and the screen B display the same image.

Next, upon the user pressing the function button 16, the image processing unit 22 performs the dark area tone correction processing for the image data thus stored in the RAM 25, thereby creating the processed image data. The processed image data thus created is stored in the screen B region of the RAM 25 as the new image data for the screen B. The image processing unit 22 reads out the image data for the screen A and the image data for the screen. B from the RAM 25, and creates the composite image data based upon the image data for the screen A and the image data for the screen B. Then, the monitor control unit 23 displays the processed composite image data on the back face monitor 15. In this state, upon further pressing the shutter release button 10, the control unit 20 stores the processed image data thus created in the external memory 28.

As described above, with such an arrangement, the screens A and B of the back face monitor 15 display the captured image and the processed image that is obtained by performing predetermined image processing for the captured image, respectively. Let us consider a case in which image processing is performed for the captured image displayed on the screen A. In this case, such an arrangement allows the user to immediately make a comparison between the image before the processing and the image after the processing in a relatively simple manner.

Note that the trimming processing described in Modification 7 may be understood to be included in the image processing explained in Modification 8.

As described above, with the digital camera according to the embodiment and Modifications 1-8 of the present invention, a plurality of sets of information can be ascertained easily.

The above-described embodiments are examples, and various modifications can be made without departing from the scope of the invention.

What is claimed is:

1. A digital camera comprising:
   an image processing unit that creates first display image data and second display image data;
   a display device that displays a first screen image and a second screen image, simultaneously or concurrently, so as to allow a user to observe the first screen image when viewed along a first direction with respect to an orientation of a display face and so as to allow the user to observe the second screen image when viewed along a second direction that differs from the first direction;
   a control unit that instructs the display device to display the first display image data as the first screen image, and the second display image data as the second screen image; and
   an imaging device that captures an image of a subject, and outputs a subject image signal, wherein:
   the image processing unit creates the first display image data based upon the subject image signal; and
   the control unit instructs the image processing unit to serially create the first display image data, and instructs the display device to display the first display image data thus serially created in a form of a moving image.

2. A digital camera according to claim 1, wherein:
   the image processing unit creates the second display image data by superimposing predetermined information on the first display image data; and
   the control unit instructs the image processing unit to serially create the second display image data, and instructs the display device to display the second display image data thus serially created in a form of a moving image.

3. A digital camera according to claim 1, further comprising:
   a storage unit that temporarily stores an original image to be used for creating the second display image data with the image processing unit, wherein:

the image processing unit creates the second display image data based upon the original image data stored in the storage unit; and the control unit instructs the display device to display the second display image data as the second screen image in a form of a still image.

4. A digital camera, comprising:

an image processing unit that creates first display image data and second display image data;

a display device that displays a first screen image and a second screen image, simultaneously or concurrently, so as to allow a user to observe the first screen image when viewed along a first direction with respect to an orientation of a display face and so as to allow the user to observe the second screen image when viewed along a second direction that differs from the first direction;

a control unit that instructs the display device to display the first display image data as the first screen image, and the second display image data as the second screen image; and a menu storing unit that stores first menu screen information and second menu screen information for displaying multiple menu items on the display device, wherein:

the image processing unit creates the first display image data and the second display image data based upon the first menu screen information and the second menu screen information, respectively.

5. A digital camera, comprising:

an image processing unit that creates first display image data and second display image data;

a display device that displays a first screen image and a second screen image, simultaneously or concurrently, so as to allow a user to observe the first screen image when viewed along a first direction with respect to an orientation of a display face and so as to allow the user to observe the second screen image when viewed along a second direction that differs from the first direction;

a control unit that instructs the display device to display the first display image data as the first screen image, and the second display image data as the second screen image;

an imaging device that captures an image of a subject, and outputs a subject image signal; and a storage unit that temporarily stores an original image to be used for creating the first display image data with the image processing unit, wherein:

the image processing unit creates the first display image data based upon the original image data stored in the storage unit and creates the second display image data representing image information based upon image information attached to the original image data.

6. A digital camera, comprising:

an image processing unit that creates first display image data and second display image data;

a display device that displays a first screen image and a second screen image, simultaneously or concurrently, so as to allow a user to observe the first screen image when viewed along a first direction with respect to an orientation of a display face and so as to allow the user to observe the second screen image when viewed along a second direction that differs from the first direction;

a control unit that instructs the display device to display the first display image data as the first screen image, and the second display image data as the second screen image; and a storage unit that temporarily stores an original image to be used for creating the first display image data and the second display image data with the image processing unit, wherein:

the image processing unit creates the first display image data based upon the original image data stored in the storage unit and creates the second display image data that differs from the first display image data by subjecting the original image data to image processing.

7. A digital camera according to claim 6, wherein:

the image processing unit creates a trimmed image data by trimming the original image data and then creates the second display image data based upon the trimmed image data.

8. A digital camera, comprising:

an image processing unit that creates first display image data and second display image data;

a display device that displays a first screen image and a second screen image, simultaneously or concurrently, so as to allow a user to observe the first screen image when viewed along a first direction with respect to an orientation of a display face and so as to allow the user to observe the second screen image when viewed along a second direction that differs from the first direction;

a control unit that instructs the display device to display the first display image data as the first screen image, and the second display image data as the second screen image;

an imaging device that captures an image of a subject, and outputs a subject image signal; and a storage unit that temporarily stores image data, wherein:

the image processing unit performs processing (a) in which the first display image data is created based upon the subject image signal captured by and output from the imaging device with first camera settings, and the first display image data thus created is stored in the storage unit, and processing (b) in which the second display image data is created based upon the subject image signal captured by and output from the imaging device with second camera settings that differ from the first camera settings, and the second display image data thus created is stored in the storage device; and the control unit instructs the display device to display the first image display data and the second display image data, which are stored in the storage unit, in the form of the first screen image and the second screen image, respectively.

* * * * *